US010021419B2

(12) United States Patent
Karczewicz et al.

(10) Patent No.: US 10,021,419 B2
(45) Date of Patent: Jul. 10, 2018

(54) RICE PARAMETER INITIALIZATION FOR COEFFICIENT LEVEL CODING IN VIDEO CODING PROCESS

(71) Applicant: QUALCOMM Incorporated, San Diego, CA (US)

(72) Inventors: Marta Karczewicz, San Diego, CA (US); Joel Sole Rojals, La Jolla, CA (US); Rajan Laxman Joshi, San Diego, CA (US); Liwei Guo, San Diego, CA (US)

(73) Assignee: QUALCOMM Incorported, San Diego, CA (US)

( * ) Notice: Subject to any disclaimer, the term of this patent is extended or adjusted under 35 U.S.C. 154(b) by 844 days.

(21) Appl. No.: 14/327,398

(22) Filed: Jul. 9, 2014

(65) Prior Publication Data
US 2015/0016537 A1    Jan. 15, 2015

Related U.S. Application Data

(60) Provisional application No. 61/845,850, filed on Jul. 12, 2013, provisional application No. 61/846,512, (Continued)

(51) Int. Cl.
H04N 7/12       (2006.01)
H04N 19/91      (2014.01)
(Continued)

(52) U.S. Cl.
CPC ............. *H04N 19/60* (2014.11); *H04N 19/13* (2014.11); *H04N 19/136* (2014.11); *H04N 19/176* (2014.11); *H04N 19/91* (2014.11)

(58) Field of Classification Search
CPC .... H04N 19/13; H04N 19/136; H04N 19/176; H04N 19/60; H04N 19/91
See application file for complete search history.

(56) References Cited

U.S. PATENT DOCUMENTS 6,987,468 B1    1/2006   Malvar
2012/0014454 A1  1/2012   Budagavi et al.
(Continued)

FOREIGN PATENT DOCUMENTS

AU    2012202182 A1    10/2013
CN    102238387 A     11/2011
(Continued)

OTHER PUBLICATIONS

T. Nguyen, Reduced-complexity entropy coding of transform coefficient levels using a combination of VLC and PIPE, Jan. 2011, Joint Collaborative Team on Video Coding (JCT-VC) of ITU-T SG16 WP3 and ISO/IEC JTC1/SC29/WG11 4th meeting: Daegu, KR Jan. 20-28, 2011.*

(Continued)

Primary Examiner — Jessica M Prince
(74) Attorney, Agent, or Firm — Shumaker & Sieffert, P.A.

(57) ABSTRACT

Techniques are described for initializing a Rice parameter used to define codes for coefficient level coding. According to the techniques, the initial value of the Rice parameter is determined for a coefficient group (CG) in a transform block of video data based on statistics of coefficient levels that are gathered for previously coded coefficients of the video data. The statistics may be statistics of absolute values of coefficient levels or remaining absolute values of coefficient levels of previously coded coefficients. A value of the statistics may be initialized to zero at a beginning of a video slice and updated based on coefficient levels coded in each CG of the slice. The statistics may be updated once per CG. In some cases, statistics may be gathered separately for each of a plurality of different categories of CGs that are defined based on characteristics of transform blocks that include the CGs.

52 Claims, 9 Drawing Sheets

Related U.S. Application Data filed on Jul. 15, 2013, provisional application No. 61/882,536, filed on Sep. 25, 2013, provisional application No. 61/898,968, filed on Nov. 1, 2013, provisional application No. 61/907,693, filed on Nov. 22, 2013, provisional application No. 61/915,337, filed on Dec. 12, 2013.

(51) Int. Cl.

| | |
|---|---|
| H04N 19/60 | (2014.01) |
| H04N 19/176 | (2014.01) |
| H04N 19/13 | (2014.01) |
| H04N 19/136 | (2014.01) |

(56) References Cited

U.S. PATENT DOCUMENTS

| | | | |
|---|---|---|---|
| 2013/0003838 | A1 | 1/2013 | Gao et al. |
| 2013/0004092 | A1* | 1/2013 | Sasai .............. H04N 19/70 382/233 |
| 2013/0188699 | A1 | 7/2013 | Joshi et al. |
| 2013/0301738 | A1 | 11/2013 | Kim et al. |
| 2013/0343464 | A1* | 12/2013 | Van der Auwera .. H04N 19/176 375/240.18 |
| 2014/0003529 | A1* | 1/2014 | Joshi .............. H04N 19/13 375/240.18 |
| 2014/0307800 | A1 | 10/2014 | Sole et al. |
| 2014/0362925 | A1* | 12/2014 | Nguyen .......... H03M 7/4018 375/240.18 |
| 2015/0078443 | A1* | 3/2015 | Kolesnikov ...... H03M 7/4075 375/240.03 |
| 2015/0181237 | A1 | 6/2015 | Tsukuba et al. |

FOREIGN PATENT DOCUMENTS

| | | |
|---|---|---|
| CN | 102368385 A | 3/2012 |
| EP | 1653746 A2 | 5/2006 |
| JP | 2015504256 A | 2/2015 |
| WO | 2012095488 A2 | 7/2012 |
| WO | 2012155553 A1 | 11/2012 |
| WO | 2013022748 A1 | 2/2013 |
| WO | 2013107908 A1 | 7/2013 |
| WO | 2013108639 A1 | 7/2013 |

OTHER PUBLICATIONS

International Preliminary Report on Patentability from International Application No. PCT/US2014/033780, dated Jul. 27, 2015, 17 pp.
International Search Report and Written Opinion from International Application No. PCT/US2014/033780, dated Nov. 3, 2014, 24 pp.
Partial International Search Report from International Application No. PCT/US2014/033780, dated Aug. 21, 2014, 11 pp.
Second Written Opinion from International Application No. PCT/US2014/033780, dated May 8, 2015, 12 pp.
Response to Written Opinion dated Nov. 3, 2014, from International Application No. PCT/US2014/033780, filed on Feb. 12, 2015, 9 pp.
Response to Second Written Opinion dated May 8, 2015, from International Application No. PCT/US2014/033780, filed on Jul. 8, 2015, 43 pp.
Office Action from U.S. Appl. No. 14/250,282, dated Dec. 29, 2016, 27 pp.
Amendment in Response to Office Action from U.S. Appl. No. 14/250,282, dated Dec. 29, 2016, which was filed on Mar. 27, 2017, 22 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Budagavi, "AHG8: Coefficient level RiceParam updates for screen content coding," 13th JCT-VC Meeting; Apr. 18-26, 2013; Incheon; (Joint Collaborative Team on Video Coding of ISO/IEC JTC1/SC29/WG11 and ITU-T SG16); URL: http://wftp3.itu.int/av-arch/jctvc-site/, No. JCTVC-M0316, 2013, 5 pp.
Karczewicz, et al., "Non-RCE2: Rice Parameter Initialization", JCT-VC Meeting; Jul. 25-Aug. 2, 2013; Vienna; (Joint Collaborative Team on Video Coding of ISO/IEC JTC1/SC29/WG11 and ITU-T SG16); URL: http://wftp3.itu.int/av-arch/jctvc-site/, No. JCTVC-N0181-v2, XP030114665, 8 pp.
Karczewicz, et al., "RCE2: Results of Test D1 on Rice Parameter Initialization", JCT-VC Meeting; Oct. 23- Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-00239-v3, XP030115298, 7 pp.
Memon "Adaptive coding of DCT coefficients by Golomb-Rice codes", Image Processing, ICIP 98. Proceedings. 1998 International Conference on Chicago, IL, USA; Oct. 1998, Los Alamitos, CA, USA,IEEE Comput. Soc, US, vol. 1 XP010308805, pp. 516-520.
Nguyen, et al., "Non-CE11: Proposed Cleanup for Transform Coefficient Coding," Document JCTVC-H0228, Joint Collaborative Team on Video Coding (JCT-VC) of ITU-T SG16 WP3 and ISO/IEC JTC1/SC29/WG11, 8th Meeting: San José, CA, USA, XP030111255, Feb. 1-10, 2012, 9 pp.
Nguyen et al., "Reduced-complexity entropy coding of transform coefficient levels using a combination of VLC and PIPE", JCT-VC Meeting; MPEG Meeting; Jan. 20-28, 2011; Daegu;(Joint Collaborative Team on Video Coding of ISO/IEC JTC1/SC29/WG11and ITU-T SG.16);URL:http://wftp3.itu.int/av-arch/jctvc-site/, No. JCTVC-D336, XP030008375, 8 pp.
Sole et al., "AhG8: Simplified update of the coefficient level Rice parameter," 13th JCT-VC Meeting; Apr. 18-26, 2013; Incheon; (Joint Collaborative Team on Video Coding of ISO/IEC JTC1/

(56) References Cited

OTHER PUBLICATIONS

SC29/WG11 and ITU-T SG16); URL: http://wftp3.itu.int/av-arch/jctvc-site/, No. JCTVC-M0366, 2013, 3 pp.
Sole et al., "RCE2 Test A1: Simplified update of the coefficient level Rice Parameter", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O0206, XP030115251, 5 pp.
Sole et al., "Transform Coefficient Coding in HEVC", IEEE Transactions on Circuits and Systems for Video Technology,IEEE Service Center, Piscataway, NJ, US, vol. 22, No. 12, Dec. 2012; XP011487805, ISSN: 1051-8215, pp. 1765-1777.
Karczewicz, "RCE2: Results of Test 1 on Rice Parameter Initialization," (Joint Collaborative Team on Video Coding of ISO/IEC JTC1/SC29/WG11 and ITU-T SG.16); Jan. 9-17, 2014, Document: JCTVC-P0199 _r2, 6 pp.
Amonou, et al., "Description of video coding technology proposal by France Telecom, NTT, NTT, DOCOMO, Panasonic and Techicolor," (Joint Collaborative Team on Video Coding of ISO/IEC JTC1/SC29/WG11 and ITU-T SG.16); Apr. 15-23, 2010, Document: JCTVC-A114, 42 pp.
Alshin, et al., "Multi-parameter probability up-date for CABAC," Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F254, 7 pp.

International Search Report and Written Opinion from International Application No. PCT/US2014/046218, dated Jan. 9, 2015, 23 pp.
Response to Written Opinion dated Jan. 9, 2015, from International Application No. PCT/US2014/046218, filed on May 11, 2015, 9 pp.
Second Written Opinion from International Application No. PCT/US2014/046218, dated Jul. 2, 2015, 12 pp.
Response to Second Written Opinion dated Jul. 2, 2015, from International Application No. PCT/US2014/046218, filed on Sep. 2, 2015, 28 pp.
Partial International Search Report from International Application No. PCT/US2014/046218, dated Oct. 14, 2014, 11 pp.
International Preliminary Report on Patentability from International Application No. PCT/US2014/046218, dated Sep. 29, 2015, 14 pp.
Final Office Action from U.S. Appl. No. 14/250,282 dated Jul. 14, 2017 (18 pages).
Response to Final Office Action dated Jul. 14, 2017 from U.S. Appl. No. 14/250,282, filed Sep. 14, 2017 (19 pages).
Examination Report from Australian Application Serial No. 2014287132 dated Aug. 22, 2017 (4 pages).
Notice of Allowance from U.S. Appl. No. 14/250,282 dated Jan. 24, 2018 (9 pp).
Bross B., et al., "High Efficiency Video Coding (HEVC) Text Specification Draft 10 (for FDIS & Last Call)," Joint collaborative Team on Video Coding (JCT-VC) of ITU-T SG 16 WP 3 and ISO/IEC JTC1/SC29/WG 11, 12th Meeting:Geneva, CH, Jan. 14-23, 2013, JCTVC-L1003-v34, 263 pp.

* cited by examiner

RICE PARAMETER INITIALIZATION FOR COEFFICIENT LEVEL CODING IN VIDEO CODING PROCESS

This application claims the benefit of U.S. Provisional Patent Application No. 61/845,850, filed Jul. 12, 2013. U.S. Provisional Patent Application No. 61/846,512, filed Jul. 15, 2013, U.S. Provisional Patent Application No. 61/882,536, filed Sep. 25, 2013, U.S. Provisional Patent Application No. 61/898,968, filed Nov. 1, 2013, U.S. Provisional Patent Application No. 61/907,693, filed Nov. 22, 2013, and U.S. Provisional Patent Application No. 61/915,337, filed Dec. 12, 2013, the entire content of each of which is incorporated herein by reference.

TECHNICAL FIELD

This disclosure relates to video coding, and more particularly to techniques for coding transform coefficients.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video slice, i.e., a video frame or a portion of a video frame) may be partitioned into blocks. Video blocks in an intra-coded (I) slice of a picture are encoded using spatial prediction with respect to reference samples in neighboring blocks in the same picture. Video blocks in an inter-coded (P or B) slice may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients, and entropy coding may be applied to achieve even more compression.

SUMMARY

In general, this disclosure describes techniques for initialization of a Rice parameter used to define codes for coefficient level coding in a video coding process. In particular, this disclosure describes techniques for determining an initial value of the Rice parameter used to define codes, e.g., Golomb-Rice codes or Exponential-Golomb codes, for coding remaining absolute values of coefficient levels for coefficients where context adaptive binary arithmetic coding (CABAC) is used to code indications of significant coefficients, coefficient levels greater than 1, and coefficient levels greater than 2. In some examples, the techniques may be applied to Rice parameter initialization for coefficient level coding in range extensions of the high efficiency video coding (HEVC) standard.

The techniques described in this disclosure determine an initial value of the Rice parameter for a current coefficient group (CG), i.e., a block of coefficients, in a transform block of video data based on statistics of coefficient levels that are gathered for previously coded coefficients of the video data. The CG may include transform coefficients, in the case of lossy coding, or coefficients for which a transform is not applied, in the case of lossless coding or lossy coding in transform skip mode. The statistics may be statistics of absolute values of coefficient levels or remaining absolute values of coefficient levels of previously coded coefficients. A value of the statistics may be initialized to zero at a beginning of each slice of video data and the statistics may be updated based on one or more coefficient levels coded in each CG of the slice. In one example, the statistics may be updated once per CG when a first coefficient level is coded in the CG. In some cases, statistics may be gathered separately for each of a plurality of different categories of CGs that are defined based on characteristics of transform blocks that include the CGs. According to the techniques of this disclosure, at the beginning of a current CG in a transform block, a value of the statistics is mapped to an initial value of the Rice parameter for the current CG.

In one example, this disclosure is directed toward a method of decoding coefficients in a video decoding process, the method comprising determining statistics of coefficient levels for previously decoded coefficients of residual video data, determining an initial value of a Rice parameter for a current coefficient group in a transform block of the residual video data based on the statistics, and decoding a remaining absolute value of a coefficient level for at least one coefficient in the current coefficient group using codes defined by the Rice parameter.

In another example, this disclosure is directed toward a method of encoding coefficients in a video encoding process, the method comprising determining statistics of coefficient levels for previously encoded coefficients of residual video data, determining an initial value of a Rice parameter for a current coefficient group in a transform block of the residual video data based on the statistics, and encoding a remaining absolute value of a coefficient level for at least one coefficient in the current coefficient group using codes defined by the Rice parameter.

In a further example, this disclosure is directed to a video coding device comprising a memory configured to store video data, and one or more processors configured to determine statistics of coefficient levels for previously coded coefficients of residual video data, determine an initial value of a Rice parameter for a current coefficient group in a transform block of the residual video data based on the statistics, and code a remaining absolute value of a coefficient level for at least one coefficient in the current coefficient group using codes defined by the Rice parameter.

In another example, this disclosure is directed to a video coding device comprising means for determining statistics of coefficient levels for previously coded coefficients of residual video data, means for determining an initial value of a Rice parameter for a current coefficient group in a transform block of the residual video data based on the statistics, and means for coding a remaining absolute value of a coefficient level for at least one coefficient in the current coefficient group using codes defined by the initial value of the Rice parameter.

In a further example, this disclosure is directed to a computer-readable storage medium comprising instructions that when executed by one or more processors of a video coding device cause the processors to determine statistics of coefficient levels for previously coded coefficients of residual video data, determine an initial value of a Rice parameter for a current coefficient group in a transform block of the residual video data based on the statistics, and code a remaining absolute value of a coefficient level for at least one coefficient in the current coefficient group using codes defined by the Rice parameter.

The details of one or more examples are set forth in the accompanying drawings and the description below. Other features, objects, and advantages will be apparent from the description and drawings, and from the claims.

DETAILED DESCRIPTION

Figure 1:
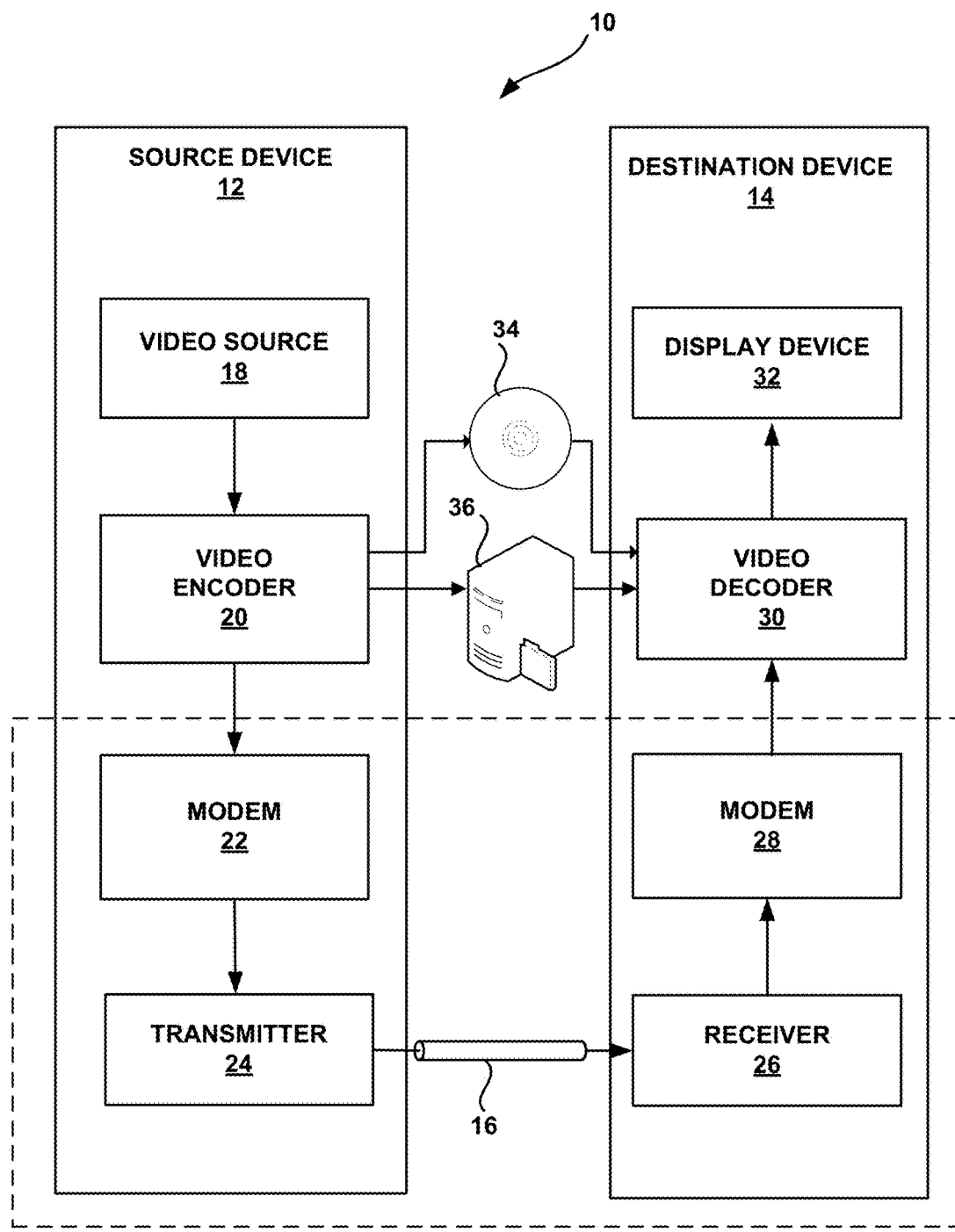
FIG. 1 is a block diagram illustrating an example video encoding and decoding system that may utilize the techniques for coding coefficient levels described in this disclosure.

This disclosure describes techniques for coding coefficients associated with residual data in a video coding process. The techniques are configured for initialization of a Rice parameter used to define codes for coefficient level coding in a video coding process. In particular, this disclosure describes techniques for determining an initial value of the Rice parameter used to define codes, e.g., Golomb-Rice codes or Exponential-Golomb codes, for coding remaining absolute values of coefficient levels for a block of coefficients where context adaptive binary arithmetic coding (CABAC) is used to code indications of significant coefficients, coefficient levels greater than 1, and coefficient levels greater than 2. The coefficient levels may be levels of transform coefficients, in the case of lossy coding, or levels of coefficients for which a transform is not applied (i.e. residual pixel values), in the case of lossless coding or lossy coding in transform skip mode. In some examples, the techniques may be applied to Rice parameter initialization for coefficient level coding in range extensions of the High Efficiency Video Coding (HEVC) standard.

The Rice parameter is a tunable value used to select a codeword set from the family of Golomb codes, e.g., Golomb-Rice codes or Exponential-Golomb codes. The codes defined by the Rice parameter may be used to code a remaining absolute value of a coefficient level for at least one coefficient in a coefficient group (CG), i.e., a block of coefficients. In the example of HEVC, each of the CGs may comprise a 4×4 transform block or a 4×4 subblock of a transform block of video data. The CGs may include transform coefficients, in the case of lossy coding, or coefficients for which a transform is not applied, in the case of lossless coding or lossy coding in transform skip mode. In some processes, the initial value of the Rice parameter is set equal to zero at the beginning of each CG and conditionally updated after coding remaining absolute values of coefficient levels in the CG. In the case of coding coefficient levels for screen content or in the case of lossless coding or lossy coding in transform skip mode, initializing the value of the Rice parameter to zero for each CG may not be optimal.

The techniques described in this disclosure adaptively set the initial value of the Rice parameter to code (e.g., encode or decode) each CG, rather than setting the initial value of the Rice parameter to zero for all cases. Specifically, this disclosure describes techniques for determining the initial value of the Rice parameter for a current CG based on statistics of coefficient levels that are gathered for previously coded coefficients. This disclosure also describes techniques for determining the statistics of the coefficient levels for the previously coded coefficients of the video data.

The statistics may be statistics of absolute values of coefficient levels or remaining absolute values of coefficient levels of previously coded coefficients. A value of the statistics may be initialized to zero at a beginning of each slice of video data and the statistics may be updated based on one or more coefficient levels coded in each CG of the slice. In some cases, the statistics may be updated once per CG when a first absolute value of a coefficient level or a first remaining absolute value of a coefficient level is coded in the CG. In other cases, the statistics may be gathered more frequently or based on a different coefficient level, e.g., when a last absolute value of a coefficient level or a last remaining absolute value of a coefficient level is coded in the CG.

As one example, the statistics may be determined by comparing a coefficient level for a given previously coded coefficient to a pre-defined function of the statistics, and then determining whether to increase or decrease a value of the statistics based on the comparison. The pre-defined function of the statistics used to update the statistics may be based on a first constant value that is left-shifted by the value of the statistics divided by a second constant value. In other examples, the statistics may be determined according to different techniques.

In some cases, statistics may be gathered separately for each of a plurality of different categories of CGs that are defined based on characteristics of transform blocks that include the CGs. In this case, a category of a current CG in a transform block may be determined based on the characteristics of the transform block, and the Rice parameter may be initialized for the current CG based on the statistics for the determined category. In one example, separate statistics may be gathered for each of four different categories based on whether or not the transform blocks are luma blocks and whether or not the transform blocks are transform skip blocks. In other examples, the statistics may be partitioned into a different number of categories that are defined based on different types of transform block characteristics.

According to the techniques of this disclosure, at the beginning of a current CG, a value of the statistics is mapped to an initial value of the Rice parameter for the current CG. In some examples, the value of the statistics may be mapped to the initial Rice parameter value according to a function of the statistics. The function of the statistics used to initialize the Rice parameter may be based on a selection of a minimum of either a maximum value of the Rice parameter or the value of the statistics divided by a constant value. In other examples, the value of the statistics may be mapped to the initial value of the Rice parameter according to a different function or according to a stored table. The initial value of the Rice parameter for the current CG is used to define codes, e.g., Golomb-Rice codes or Exponential-Golomb codes, for coding remaining absolute values of coefficient levels for at least one coefficient in the current CG.

In some examples, a video encoder may encode coefficient levels of coefficients associated with residual video data into a bitstream for transmission to a video decoder or a storage device. Upon receipt of the encoded bistream, the video decoder may decode the coefficient levels of the residual video data in a reciprocal manner to the video encoder. In the case of lossy video coding, the coefficients may be quantized transform coefficients. In this case, the quantized transform coefficients may be generated, for example, by applying a transform, such as a discrete cosine transform (DCT), to residual video data and then applying quantization to the transform coefficients. In the case of lossless video coding or lossy video coding with transform skipping or bypass, the coefficients may be pixel values of residual video data and have coefficient levels, i.e., pixel values, with large absolute values. When the coefficients represent screen content, which may include graphics and text regions, the content may not be well predicted resulting in large absolute values of coefficient levels for the coefficients.

The Rice parameter initialization scheme described in this disclosure allows the initial value of the Rice parameter to be set to a non-zero value at the beginning of a current CG in order for the Rice parameter to quickly and efficiently adapt to large coefficient values, which may occur if the current CG includes screen content or is coded with transform skipping or bypass. According to the techniques, the initial value of the Rice parameter may be determined based on statistics of coefficient levels for previously coded coefficients. In this way, the Rice parameter may be initialized to a non-zero value in order to accommodate a slice or coding unit of screen content and/or coefficients that have not been transformed or quantized, but may still be initialized to zero in the case of a slice or coding unit of natural content. For example, when large coefficient levels for previously coded coefficients result in a large value of the statistics, the initial value of the Rice parameter may be set equal to a non-zero value in accordance with the large value of the statistics in order to more quickly adapt to the large coefficient values that will likely occur in the current CG.

FIG. 1 is a block diagram illustrating an example video encoding and decoding system 10 that may utilize the techniques for coding coefficient levels described in this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for coding coefficient levels, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem. Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard in document JCTVC-L1003v34, Bross et al., "High efficiency video coding (HEVC) text specification draft 10," Joint Collaborative Team on Video Coding (JCT-VC) of ITU-T SG16 WP3 and ISO/IEC JTC1/SC29/WG11, 12th Meeting: Geneva, CH, 14-23 Jan. 2013, is available from http://phenix.int-evry.fr/jct/doc_end_user/documents/12_Geneva/wg11/JCTVC-L1003-v34.zip.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for encoding coefficient levels in a video encoding process. Likewise, video decoder 30 may implement any or all of these techniques for decoding coefficient levels in a video decoding process. A video coder, as described in this disclosure, may refer to a video encoder or a video decoder. Similarly, a video coding unit may refer to a video encoder or a video decoder. Likewise, video coding may refer to video encoding or video decoding.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences. The HEVC standard described above is based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes. The following section will discuss certain aspects of the HM in more detail.

For video coding according to the HEVC standard, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PUs may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. A TU includes a luma transform block and two chroma transform blocks. As such, any coding process discussed below that is applied to a TU, may be, in actuality, applied to the luma and chroma transform blocks.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock. i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to be coded and the pixel values in the predictive block selected to represent the coded block. To achieve better compression, the prediction residual data may be transformed, e.g., using a discrete cosine transform (DCT), a discrete sine transform (DST), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. In some examples, such as lossless coding or lossy coding with transform skipping or bypass, both the transform and quantization procedures may be skipped for the coefficients.

An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the coefficients. In some examples, video encoder 20 may utilize a predefined scan order to scan the coefficients to produce a serialized vector that can be entropy encoded. In other examples, video encoder 20 may perform an adaptive scan. After scanning the coefficients to form a one-dimensional vector, video encoder 20 may entropy encode the one-dimensional vector, Video encoder 20 may also entropy encode syntax elements associated with the encoded video data for use by video decoder 30 in decoding the video data.

This disclosure is related to techniques for bypass coding in conjunction with context adaptive binary arithmetic coding (CABAC) entropy coders or other entropy coders, such as probability interval partitioning entropy coding (PIPE) or related coders. Arithmetic coding is a form of entropy coding used in many compression algorithms that have high coding efficiency, because it is capable of mapping symbols to non-integer length codewords. An example of an arithmetic coding algorithm is Context Based Binary Arithmetic Coding (CABAC).

In general, entropy coding data symbols using CABAC involves one or more of the following steps:

(1) Binarization: If a symbol to be coded is non-binary valued, it is mapped to a sequence of so-called "bins." Each bin can have a value of "0" or "1."

(2) Context Assignment: Each bin (in regular mode) is assigned to a context. A context model determines how a context for a given bin is calculated based on information available for the bin, such as values of previously encoded symbols or bin number.

(3) Bin encoding: Bins are encoded with an arithmetic encoder. To encode a bin, the arithmetic encoder requires as an input a probability of the bin's value. i.e., a probability that the bin's value is equal to "0," and a probability that the bin's value is equal to "1." The estimated probability of each context is represented by an integer value called a "context state." Each context has a state, and thus the state (i.e., estimated probability) is the same for bins assigned to one context, and differs between contexts.

(4) State update: The probability state for a selected context is updated based on the actual coded value of the bin (e.g., if the bin value was "1," the probability of "1's" is increased).

In the case of entropy coding data symbols using CABAC in bypass mode, a symbol to be coded is binarized to a sequence of bins and arithmetically coded with a fixed equal probability model (e.g., with an Exponential-Golomb code or a Golomb-Rice code). The bypass mode does not require context assignment or probability state update. For example, this disclosure describe techniques for bypass coding of remaining absolute values of coefficient levels for coefficients using codes defined by a Rice parameter. It should be noted that probability interval partitioning entropy coding (PIPE) uses principles similar to those of arithmetic coding, and can thus also utilize the techniques of this disclosure.

CABAC in H.264/AVC and HEVC uses states, and each state is implicitly related to a probability. There are variants of CABAC, in which a probability of a symbol ("0" or "1") is used directly, i.e., the probability or an integer version of the probability is the state. For example, such variants of CABAC are described in "Description of video coding technology proposal by France Telecom, NTT, NTT DOCOMO, Panasonic and Technicolor," JCTVC-A114, $1^{st}$ JCT-VC Meeting, Dresden, Del. April 2010, referred to as "JCTVC-A114" hereinafter, and A. Alshin and E. Alshina, "Multi-parameter probability update for CABAC," JCTVC-F254, $6^{th}$ JCT-VC Meeting, Torino, IT, July 2011, referred to as "JCTVC-F254" hereinafter.

To entropy code a block of coefficients, whether transformed and quantized or neither transformed nor quantized, a scanning process is usually performed so that the two-dimensional (2D) array of coefficients in a block is rearranged, according to a particular scan order, into an ordered, one-dimensional (1D) array, i.e., vector, of coefficients. Entropy coding is then applied to the vector of coefficients. The scan of the coefficients in a transform unit serializes the 2D array of coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

In the HEVC standard, position information of the significant transform coefficients (e.g., the significance map) is first coded for a transform block to indicate the location of the non-zero coefficients and the last non-zero coefficient in the scan order. The significance map and the level information (i.e., the absolute values and signs of the coefficients) are coded for each coefficient in an inverse scan order.

Figure 2:
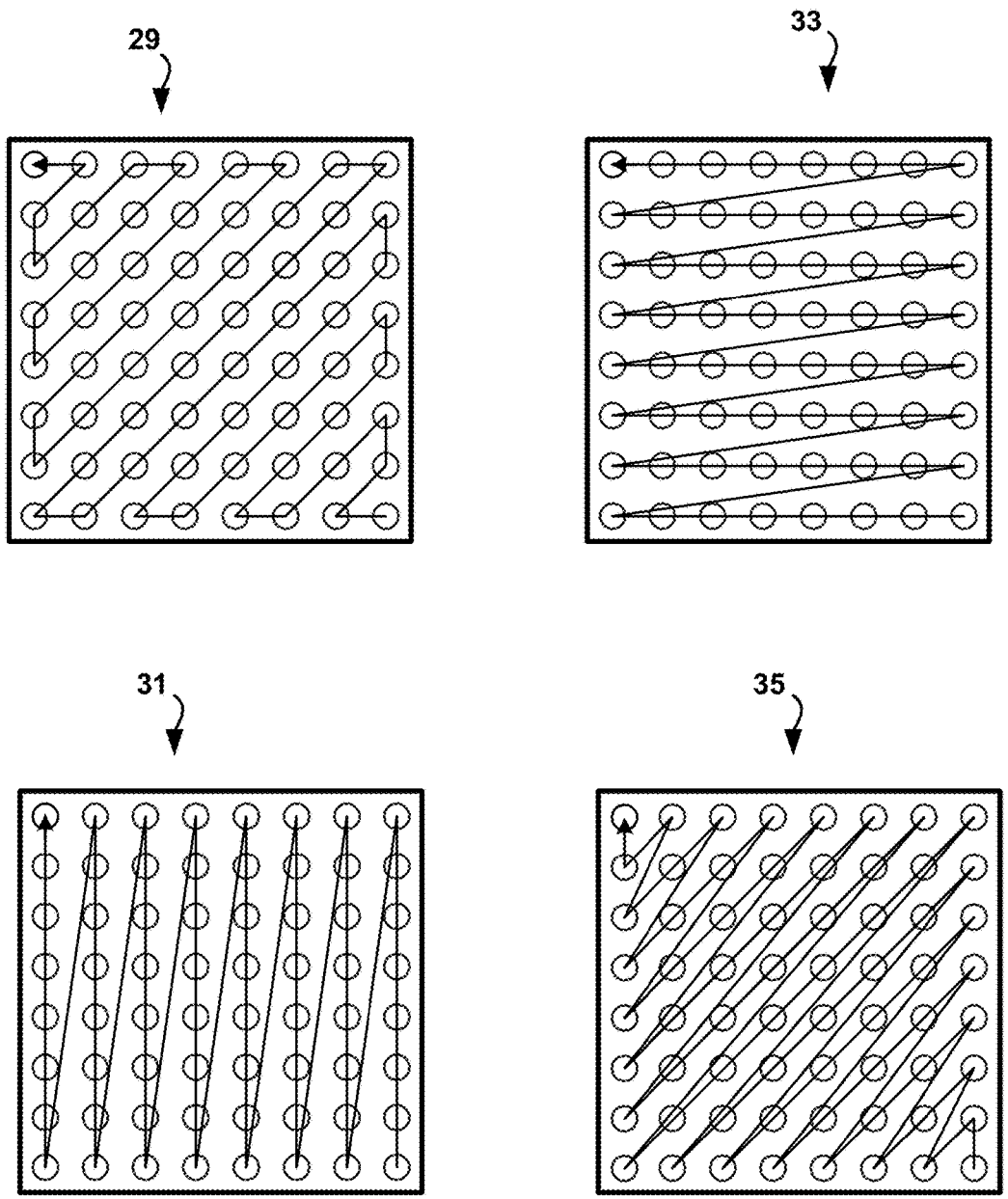
FIG. 2 is a conceptual drawing showing example inverse scan orders for coefficient level coding.

FIG. 2 is a conceptual drawing showing example inverse scan orders for coefficient level coding. The H.264 standard defines a zig-zig scan. The HEVC standard defines three different scans: a subblock diagonal scan, a subblock horizontal scan, and a subblock vertical scan. FIG. 2 illustrates an inverse zig-zag scan pattern 29, an inverse vertical scan pattern 31, an inverse horizontal scan pattern 33, and an inverse diagonal scan pattern 35 each applied to an 8×8 subblock of a transform block. Note that each of inverse diagonal scan pattern 35, inverse zig-zag scan pattern 29, inverse vertical scan pattern 31, and inverse horizontal scan pattern 33 proceed from higher frequency coefficients in the lower right corner of the transform block to lower frequency coefficients in the upper left corner of the transform block.

Subblock diagonal scan pattern 35, subblock horizontal scan pattern 33, and subblock vertical scan pattern 31 may be applied for 4×4 and 8×8 transform blocks in the HEVC standard. Subblock diagonal scan pattern 35 may also be applied for 16×16 and 32×32 transform blocks in the HEVC standard. In some examples, subblock diagonal scan pattern 35 may also be applied to an 8×8 TU. In a subblock-based scan, one 4×4 subblock of a larger transform block is scanned before proceeding to another 4×4 subblock within the larger transform block. In other examples, a "subblock" may consist of a number of consecutively scanned coefficients according to the scan order used. For example, the "subblock" may consist of 16 consecutively scanned coefficients along a diagonal scan order.

Figure 3:
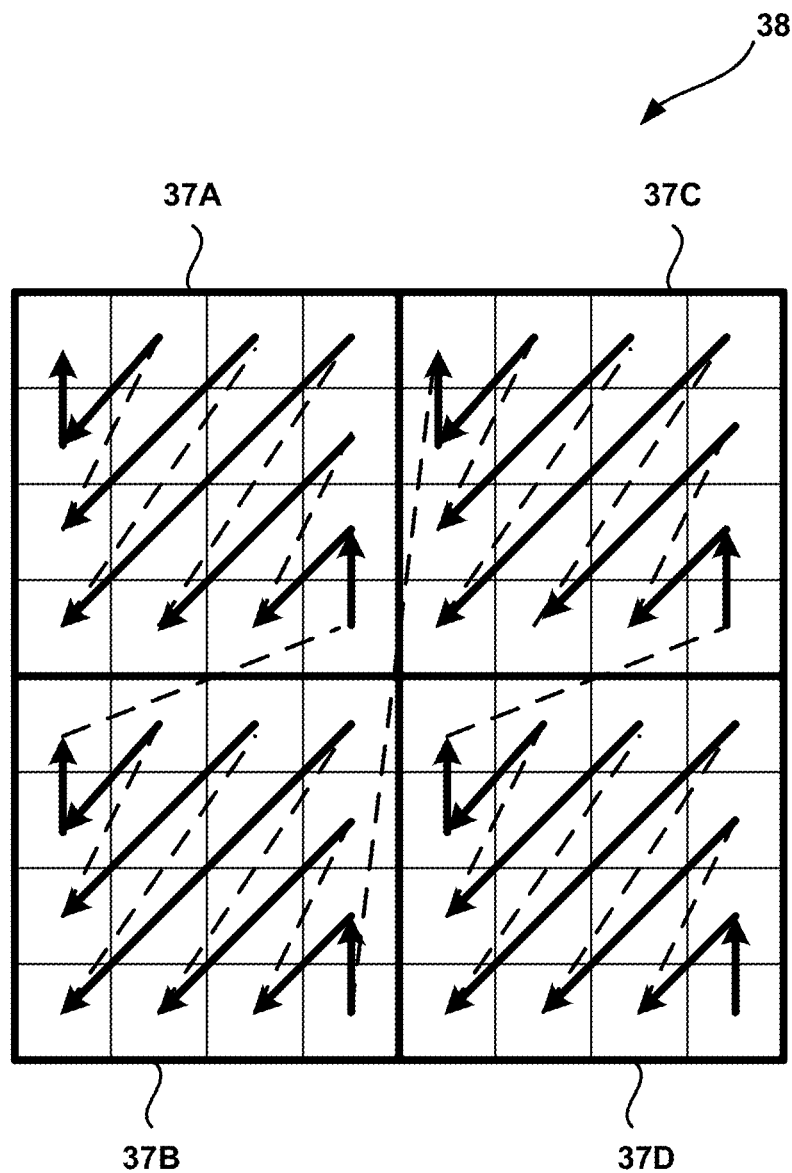
FIG. 3 is a conceptual drawing showing an example subblock-based inverse diagonal scan order for coefficient level coding of coefficient groups (CGs).

FIG. 3 is a conceptual drawing showing an example subblock-based inverse diagonal scan order for coefficient level coding of coefficient groups (CGs). FIG. 3 illustrates an 8×8 transform block 38 that consists of four 4×4 subblocks (37A, 37B, 37C, 37D). As shown in FIG. 3, coefficients in subblock 37D are scanned before scanning coefficients in subblock 37C. The scan then proceeds from subblock 37C to subblock 37B, and finally to subblock 37A. FIG. 3 depicts an inverse diagonal scan order in each subblock. In other examples, any scanning order may be used (e.g. horizontal, vertical, zigzag, etc.). In some examples, forward scanning orders may be used within each subblock.

In the HEVC standard, coefficients may be grouped into a chunk or subset. The significance map and level information (i.e., absolute value and sign) of the coefficients are coded for each subset. The subset of coefficients may be referred to in this disclosure as a coefficient group (CG). A CG may be defined as n (e.g., n=16) consecutive coefficients in a scan order for a transform block, which may correspond to a 4×4 subblock. In one example, a subset consists of 16 consecutive coefficients along a scan order (e.g., a forward or inverse diagonal, horizontal, or vertical scan order) for a 4×4 transform block and an 8×8 transform block. For 16×16 and 32×32 transform blocks, a 4×4 subblock of coefficients within the larger transform block are treated as a subset. In the example of FIG. 3, each of subblocks 37 may be a CG.

The symbols described below are coded to represent the coefficient level information within a CG. In one example, all the symbols are coded in an inverse scan order. Each of the symbols may be coded in a separate scan of the CG according to the inverse scan order. The following symbols may be referred to as "flags." It should be noted that any of the "flags" discussed in this disclosure need not be limited to a binary symbol, but may also be implemented as multiple bit syntax elements.

The significant_coeff_flag, also referred to as the sigMapFlag, indicates the significance of each coefficient in a subset. A coefficient with an absolute value of greater than zero is considered to be significant. As one example, a sigMapFlag value of 0 indicates that the coefficient is not significant, i.e., not greater than zero, while a value of 1 indicates that the coefficient is significant, i.e., greater than zero. This flag may generally be referred to as a significance flag. The coeff_sign_flag, also referred to as the signFlag, indicates the sign information for any non-zero coefficients (i.e., coefficients with sigMapFlag as 1). For example, a zero for this flag indicates a positive sign, while a 1 indicates a negative sign.

The coeff_abs_level_greater1_flag also referred to as the gr1Flag, indicates whether the absolute value of the coefficient is larger than one for any non-zero coefficients (i.e., coefficients with sigMapFlag as 1 or where the sigMapFlag is implicitly derived as 1). As one example, a gr1Flag value of 0 indicates that the coefficient does not have an absolute value greater than one, while a value of 1 for the gr1Flag indicates that the coefficient does have an absolute value greater than one. This flag may generally be referred to as a greater-than-one flag.

The coeff_abs_level_greater2_flag, also referred to as the gr2Flag, indicates whether the absolute value of the coefficient is larger than two for any coefficients with an absolute value larger than one (i.e., coefficients with gr1Flag as 1). As one example, a gr2Flag value of 0 indicates that the coefficient does not have an absolute value greater than two, while a value of 1 for the gr2Flag indicates that the coefficient does have an absolute value greater than two. This flag may generally be referred to as a greater-than-two flag. The sigMapFlag, gr1Flag and gr2Flag may each be coded using CABAC.

The coeff_abs_level_remaining syntax element, also referred to as the levelRem syntax element, indicates a remaining absolute value of the coefficient level for any coefficients with absolute values greater than the values coded by the previous flags. Generally, for the levelRem syntax element, the absolute value of the coefficient level minus three is coded (i.e., abs(level)−3) for each coefficient that has an absolute value larger than two (i.e. coefficients with gr2Flag as 1). In some examples, when a maximum number of the gr1Flag and/or the gr2Flag is reached for the current CG, the levelRem syntax element may be used to code coefficient levels with absolute values less than or equal to two. The levelRem syntax element may be coded using codes defined by a value of a Rice parameter, e.g. Golomb-Rice codes or Exponential-Golomb codes.

Figure 4:
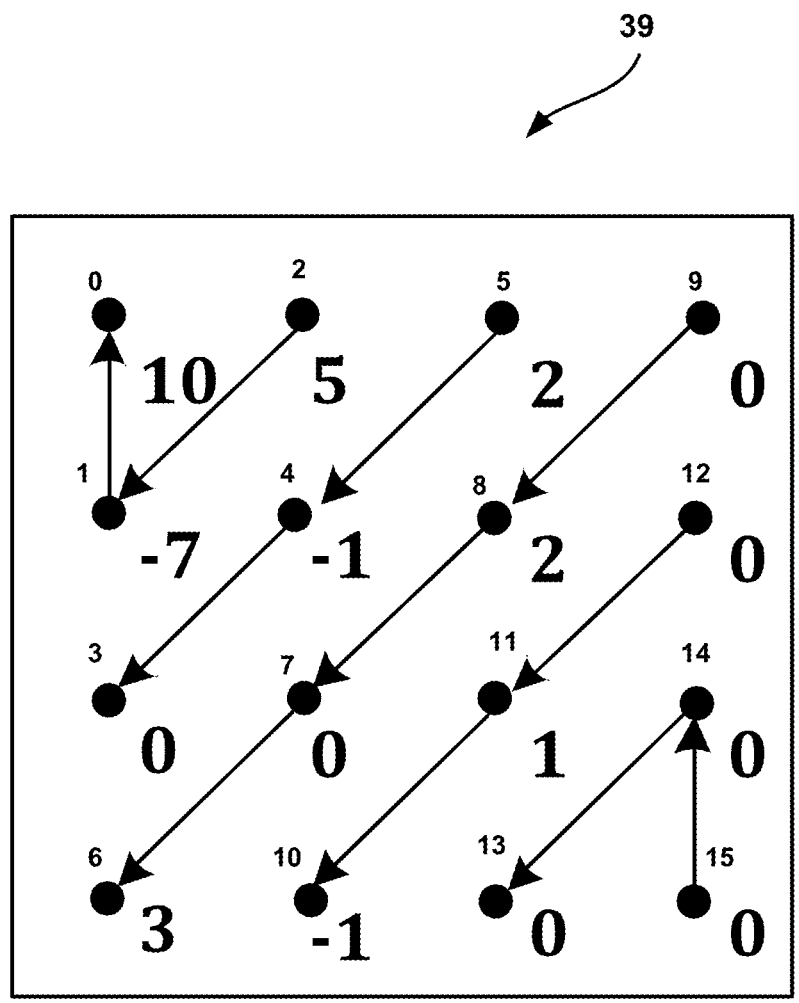
FIG. 4 is a conceptual drawing showing an example inverse diagonal scan order for coding coefficient levels for a CG.

FIG. 4 is a conceptual drawing showing an example inverse diagonal scan order for coding coefficient levels for a CG 39. CG 39 may be a 4×4 transform block or may be a 4×4 subblock in an 8×8, 16×16 or 32×32 transform block. The encoded symbols for the coefficients shown in FIG. 4, scanned in an inverse scan order, are summarized in Table 1. In Table 1, scan_pos refers to the position of the coefficient along the inverse diagonal scan pattern of CG 39 shown in FIG. 4. Scan_pos 15 is the first coefficient scanned and is located in the lower right corner of CG 39. The coefficient at scan_pos 15 has an absolute value of 0. Scan_pos 0 is the last coefficient scanned and is located in the upper left corner of CG 39. The quantized coefficient at scan_pos 0 has an absolute value of 10. In the case of a 4×4 transform block or the last 4×4 subblock in a larger transform block, the first four sigMapFlags do not need to be coded, since the position of the last non-zero coefficient is known. That is, coding of the sigMapFlag may begin at the last non-zero coefficient (in this example, the coefficient at scan_pos 11).

TABLE 1

Coded symbols for the coefficients of a coefficient group

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | −1 | 0 | 2 | 0 | 3 | 2 | −1 | 0 | 5 | 7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | 1 |
| gr2Flag | | | | | | | | 0 | | 1 | 0 | | | 1 | 1 | 1 |
| signFlag | | | | | 0 | 1 | | 0 | | 0 | 0 | 1 | | 0 | 1 | 0 |
| levelRem | | | | | | | | | | 0 | | | | 2 | 4 | 7 |

Among these symbols, the bins of sigMapFlag, gr1Flag and gr2Flag are encoded with adaptive context models, e.g., using CABAC. The signFlag and binarized bins of levelRem are encoded through bypass mode with a fixed equal probability model (e.g., with an Exponential-Golomb code or a Golomb-Rice code).

As discussed above, the syntax element coeff_abs_level_remaining (i.e., levelRem) in the HEVC standard indicates the remaining absolute value of a coefficient level for a coefficient if the value is larger than that coded in previous scan passes for coefficient coding. This syntax element coded in bypass mode in order to increase throughput. The HEVC standard employs Golomb-Rice coding for small values and switches to Exponential-Golomb (Exp-Golomb) coding for larger values. The transition point between the Golomb-Rice codes and the Exp-Golomb codes is when the unary code length equals 4. A Rice parameter is a tunable value to select the codeword set from the family of Golomb codes.

For example, Golomb-Rice codes are a subset of Golomb codes and represent a value n>=0, given a tunable Rice parameter m, as a quotient q=floor(n/m) and a remainder r=n−q×m, where m is a power of 2. The quotient q is the prefix and has a unary code representation. The remainder r is the suffix and has a fixed length representation. In Exp-Golomb codes, the code structure is similarly formed by a unary prefix followed by a fixed length suffix, but the number of codewords in the suffix part doubles after each bit in the unary code. The Exp-Golomb codes, therefore, have a slower growth of the codeword length. In general, a larger value of the Rice parameter results in slower growth of the codes, which allows for greater efficiency when coding large coefficient values. Additional details on Rice parameters may be found in "Transform Coefficient Coding in HEVC," by J. Sole, R. Joshi. M. Karczewicz, N. Nguyen, T. Ji, G. Clare, F. Henry, A. Duenas, IEEE Transactions on Circuits and Systems for Video Transmission (special issue on HEVC), December 2012.

In the HEVC standard, the Rice parameter is set equal to an initial value of zero at the beginning of each coefficient group (CG) and is conditionally updated during the coding of the CG depending on the value of the Rice parameter and the absolute value of the coefficient level for a current coefficient being coded as follows:

If absCoeffLevel>3*$2^{cRiceParam}$, then
  cRiceParam=min(cRiceParam+1,4)

Otherwise, cRiceParam=cRiceParam, where cRiceParam is the Rice parameter, absCoeffLevel is the absolute value of the coefficient level for the current coefficient, and min( ) is a function that selects a minimum value. The HEVC Rice parameter update scheme allows the binarization process to gradually adapt to the coefficient statistics when large absolute values are observed in the distribution.

As mentioned above, in the HEVC standard, the Rice parameter is reset to an initial value of zero for a current CG in a transform block of video data after coding the remaining absolute values of coefficients in a previous CG. In the case of coding coefficient levels for screen content or in the case of lossless coding or lossy coding in transform skip mode, initializing the value of the Rice parameter to zero may not be optimal. The techniques of this disclosure adaptively set an initial value of the Rice parameter at the beginning of each CG, instead of always resetting the Rice parameter to zero. According to the techniques, the initial value of the Rice parameter for a current CG may be set equal to a non-zero value. In some examples, the initial value of the Rice parameter may be determined based on statistics of the video data in order to provide better coding performance, especially for screen content and lossless coding.

In one example of a Rice parameter initialization scheme, the Rice parameter may not be reset after coding a previous CG. The initial value of the Rice parameter for a current CG may instead be set to the same value obtained for the Rice parameter at the end of coding the previous CG. As in the HEVC initialization scheme, the initial value may be set equal to 0 at the beginning of the current CG. Unlike the HEVC scheme, however, the initial value of the Rice parameter is not required to be set to 0.

In another example of a Rice parameter initialization scheme, the initial value of the Rice parameter for a current CG may be set to a value that is based on the value of the Rice parameter after coding the previous CG. In a specific example, the Rice parameter at the beginning of each CG may be initialized as follows.

cRiceParam=max(0,cRiceParam−1)

In the above example, the value of the Rice parameter is initialized for the current CG based on a selection of a maximum of either zero or a decrease in the value of the Rice parameter after coding the previous CG. In some other examples, the initial value of the Rice parameter may be capped, as in the following example.

cRiceParam=min(2,max(0,cRiceParam−1))

In this example, the initial value of the Rice parameter is capped to be no greater than 2.

In some examples, values other than 1 may be used to reduce the previous value of the Rice parameter (e.g., the value n), including subtracting 2 (i.e., n equals 2) rather than 1 from the previous value of the Rice parameter. For example, the value of the decrease for initializing the Rice parameter may be variable based on whether the current CG is included in a transform block for which a transform is applied. An example formula may be as follows.

```
if(transform_skip_flag)
    cRiceParam = max(0, cRiceParam − 1);
else
    cRiceParam = max(0, cRiceParam − 2)
```

In the above example, if the transform block is a transform skip block (i.e., transform_skip_flag=1), the value of the Rice parameter is initialized for the current CG based on a selection of a maximum of either zero or a decrease by 1 in the value of the Rice parameter after coding the previous CG. On the other hand, if the transform block is a transform skip block (i.e., transform_skip_flag=0), the value of the Rice parameter is initialized for the current CG based on a selection of a maximum of either zero or a decrease by 2 in the value of the Rice parameter after coding the previous CG.

The example cases of the Rice parameter initialization schemes described in this disclosure may be applied to CGs included in all transform blocks or may be applied to CGs based on whether a transform is applied to the transform block. For example, in the case of a transform block with transform skipping or transform bypass, the Rice parameter value may not be reset to 0 for a current CG in the transform block, but for transform blocks for which the transform has been applied, the Rice parameter may be reset to 0 for a current CG in the transform block.

For example, in the case of lossy coding in transform skip mode, the decrease in the value of the Rice parameter initialized for a current CG may be applied only for CGs in transform skip blocks. As example formula may be as follows.

```
if(transform_skip_flag)
    cRiceParam = max(0, cRiceParam − 1);
else
    cRiceParam = 0
```

In the above example, if the transform block is a transform skip block (i.e., transform_skip_flag=1), the value of the Rice parameter is initialized for the current CG based on a selection of a maximum of either zero or a decrease by 1 in the value of the Rice parameter after coding the previous CG. On the other hand, if the transform block is a transform skip block (i.e., transform_skip_flag=0), the value of the Rice parameter is initialized to zero for the current CG, as in the HEVC initialization scheme.

In a further example of a Rice parameter initialization scheme, the initial value of the Rice parameter for a current CG may be determined based on statistics of coefficient levels for previously decoded coefficients. The statistics of the coefficient levels may include statistics of absolute values of the coefficient levels or statistics of remaining absolute values of the coefficient levels for the previously coded coefficients. The initialization scheme may depend on previously coded coefficients in CGs that are included in the same transform block as the current CG and/or previously coded coefficients in CGs that are included in different transform blocks previous to the transform block that includes the current CG.

In some cases, the statistics-based Rice parameter initialization scheme may depend on one or more of the transform block type, the transform block size, the position of the CG in the transform block, whether the transform block has an intra-prediction or inter-prediction slice type, the color component of the transform block, and the bit-depth of the transform block. In addition, the statistics-based Rice parameter initialization scheme may depend on the remaining absolute level of the previously coded coefficients in previous and current transform blocks. For example, the Rice parameter initialization scheme may depend on the last coded absolute value of a coefficient level or the last coded remaining absolute value of a coefficient level in the previous CGs, on the sum or other statistic of the coefficient levels for the previously coded coefficients in the previous CGs, or, more simply, on the coefficient level of the first coefficient coded in the previous CGs.

Several examples of statistics gathering used for the statistics-based Rice parameter initialization scheme are described below. In this disclosure, the term "statCoeff" and the term "m_sumCoeff," are used interchangeably to denote the statistics, and the term "uiLevel" is used to denote the absolute value or the remaining absolute value of a coefficient level of a previously coded coefficient.

In one example, the statistics may be determined by calculating an average or running average or similar statistic of the absolute values or remaining absolute values of the coefficients levels of previous coded coefficients over a slice or coding unit (CU) of the video data. In a similar fashion to the context adaptive binary arithmetic coding (CABAC) contexts, this average or running average may be initialized at the beginning of a slice of the video data and updated at each CG of the slice based on the current coded coefficient levels in the CG. It should be understood that the remaining absolute value (i.e. coeff_abs_level_remaining value) of a coefficient level is bypass coded using codes, e.g., Golomb-Rice codes or Exponential-Golomb codes, defined by the Rice parameter. The description of CABAC and comparison to the initialization of CABAC contexts is provided to assist with understanding only.

In another example, the statistics may be determined by comparing a coefficient level for a given previously coded coefficient directly to the value of the statistics, and then determining whether to increase, decrease, or maintain the value of the statistics based on the comparison. For example, the statistics may be determined according to the following conditional equation.

$$statCoeff += (uiLevel == statCoeff) ? 0 : ((uiLevel < statCoeff) ? -1 : 1);$$

In the above equation, a value of the statistics (statCoeff) is increased if the current coefficient level (uiLevel) is larger than the previous statCoeff, and is decreased if the current coefficient level is smaller than statCoeff, or left unchanged if the current coefficient level is equal to the previous statCoeff. The value of statCoeff can be initialized to 0 at the same point in the coding process when the CABAC contexts are initialized, i.e., at the beginning of each slice of the video data being coded.

In another example, the statistics may be determined by comparing a coefficient level for a given previously coded coefficient to a pre-defined function of the statistics, and then determining whether to increase or decrease a value of the statistics based on the comparison. Again, in this example, a value of the statistics (m_sumCoeff) may be reset to zero at the beginning of each slice of the video data. The pre-defined function of the statistics may be based on a first constant value that is left-shifted by the value of the statistics divided by a second constant value. One example of the function of the statistics (m_sumCoeff) is given as follows.

```
if (uiLevel >= a*(h << (( m_sumCoeff+b ) / f+c )))
{
    m_sumCoeff+ = increase_stepsize;
}
else if (( d* uiLevel) < (h << (( m_sumCoeff+e ) / f+g )))
{
    m_sumCoeff- = decrease_stepsize;
}
```

In the above pseudo-code, a, b, c, d, e, f, g and h are parameters, and <<denotes a left-shift operation.

The following are several examples of the above equation using example values of parameters a, b, c, d, e, f, g and h. In the case where a=3, d=2, the first constant value (h) is equal to 1 and the second constant value (f) is equal to 4, and the remaining parameters are set equal to 0, the function of the statistics (m_sumCoeff) is given as follows.

```
if (uiLevel >= 3*( 1 << (m_sumCoeff/4 )))
{
    m_sumCoeff++;
}
else if (( 2* uiLevel) < ( 1 << ( m_sumCoeff/4 )))
{
    m_sumCoeff--;
}
```

In the case where a=1, d=1, the first constant value (h) is equal to 1 and the second constant value (f) is equal to 4, and the remaining parameters are set equal to 0, the function of the statistics (m_sumCoeff) is given as follows.

```
if (uiLevel >=(1 <<(m_sumCoeff/4+1)))
{
    m_sumCoeff++;
}
else if ( uiLevel < (1 << ( m_sumCoeff/4 )))
{
    m_sumCoeff--;
}
```

In some examples, the function of the statistics of the coefficient levels may include a variable related to the total number of updates applied to the statistics since initialized to zero at the beginning of the slice. One example of the function of the statistics (m_sumCoeff) including the total counter variable (m_total_counter) is given as follows.

```
if (uiLevel >=a*(h<<((m_sumCoeff+b)/f+c)))
{
    m_sumCoeff+= increase_stepsize;
}
else if ((d* uiLevel)<(h<<((m_sumCoeff+e)/f+g)))
{
    m_sumCoeff-= decrease_stepsize;
}
m_total_counter +=stepsize
```

In the above pseudo-code, a, b, c, d, e, f, g and h are parameters, << denotes a left-shift operation, and m_total_counter increases after each update of the statistics (m_sumCoeff) regardless of whether the statistics are increased or decreased.

The statistics gathering described above may be performed for the statistics-based Rice parameter initialization scheme according to a pre-defined frequency. In one example, the statistics may be updated after coding each absolute value of a coefficient level in a CG, or after coding each remaining absolute value of a coefficient level in a CG. In another example, in order to limit an increase in complexity, the statistics may be updated only once per CG or per transform block. With this approach, there may be no need to update the statistics for each coded coefficient level, but instead the statistics may be updated once per transform block or per CG (which is once every 16 coefficients in HEVC).

In some cases, the statistics may be updated only when a first absolute value of a coefficient level in a CG is coded. In other cases, the statistics may only be updated when the first remaining absolute value of a coefficient level in the CG is coded. The following pseudo-code illustrates this limitation with respect to the statistics gathering equation described above in which the value of the first coded coefficient level (uiLevel) is compared directly to the value of the statistics (statCoeff).

```
if( firstGolombCoeffinCG )
{
    statCoeff+= (uiLevel == statCoeff) ? 0 : ( ( uiLevel < statCoeff )
    ? -1 : 1);
    firstGolombCoeffinCG = false;
}
```

In the above equation, the term "firstGolombCoeffinCG" is used to denote whether the current coded coefficient level is the first remaining absolute value in the CG, the term "statCoeff" is used to denote the statistics, and the term "uiLevel" is used to denote the first absolute value or the first remaining absolute value of a coefficient level of a previously coded coefficient.

The frequency limitation may be similarly applied to the statistics gathering equation described above in which the value of the first coded coefficient level (uiLevel) is compared to a pre-defined function of the statistics (statCoeff), as shown in the following pseudo-code.

```
if( firstGolombCoeffinCG )
{
    if ( uiLevel >= 3*( 1 << ( statCoeff/4 )))        statCoeff++;
    else if (( 2* uiLevel ) < ( 1 << ( statCoeff/4 )))    statCoeff--;
    firstGolombCoeffinCG = false;
}
```

In some cases, the statistics gathering described above may performed separately for each of a plurality of different categories of CGs that are defined based on characteristics of transform blocks that include the CGs. In this case, a category of a current CG in a transform block may be determined based on the characteristics of the transform block, and the Rice parameter may be initialized for the current CG based on the statistics for the determined category. Several examples of partitioning the statistics used for the statistics-based Rice parameter initialization scheme are described below.

The characteristics of transform blocks used to partition or categorize the statistics may include one or more of whether the transform blocks are luma or chroma block types, whether the transform blocks have intra-prediction or inter-prediction slice types, the size of the transform blocks, and the positions of the CGs within the transform blocks. The characteristic of the positions of the CGs within the transform blocks may indicate whether or not a current CG is the top-left 4×4 subblock in the transform block. In addition, the characteristics may include whether or not the transform block is coded as a transform skip block, or whether the transform block is coded as a transform-quantization bypass block. The statistics, therefore, may be kept separately depending on one or more of the above characteristics. The separate statistics may be determined for each type or category of CG or transform block. The separate statistics may provide more accurate estimation for the statistics-based Rice parameter initialization scheme, but also require more storage resources.

As a first example, the following function may be used to determine a partition or category of the statistics based on the variable TYPE that depends on whether or not the transform block is a luma block and whether or not the CG is the top-left subblock in the transform block.

TYPE=2*isLuma+(iSubSet>0);

According to the above function, the variable TYPE can have 4 values depending on the transform block being a luma block (isLuma=1) or a chroma block (isLuma=0), and the CG being the top-left subblock (iSubSet=0) or not (iSubSet>0).

In another example, the partition or category of the statistics depends on whether or not the transform block is a luma block and whether or not the transform block is coded in transform skip mode.

TYPE=2*isLuma+(isTransformSkip?0:1);

According to this function, the variable TYPE can have 4 values depending on the transform block being a luma block (isLuma=1) or a chroma block (isLuma=0), and the transform block being coded in transform skip mode (isTransformSkip=1) or not (isTransformSkip=0).

In another example, the partition or category of the statistics depends on whether or not the transform block is a luma block, whether or not the CG is the top-left subblock in the transform block, and whether or not the transform block is coded in transform skip mode.

TYPE=4*isLuma+2*(isTransformSkip?0:1)+(iSubSet>0);

According to this function, the variable TYPE can have 8 values depending on the transform block being a luma block (isLuma=1) or a chroma block (isLuma=0), the transform block being coded in transform skip mode (isTransformSkip=1) or not (isTransformSkip=0), and the CG being the top-left subblock (iSubSet=0) or not (iSubSet>0).

In another example, the partition or category of the statistics depends on whether or not the transform block is coded as transform-quantization bypass. i.e., both the transform and quantization processes are bypassed for lossless coding.

Using the TYPE variable defined according to one of the several examples described above, and combining it with the statistics gathering equation described above in which the value of the first coded coefficient level (uiLevel) is compared directly to the value of the statistics (statCoeff), and the statistics gathering frequency limitation described above in which the statistics are only updated when the first coefficient level in the CG (firstGolombCoeffinCG) is coded, the combined approach would be as follows.

```
if( firstGolombCoeffinCG )
{
    statCoeff[TYPE] += ( uiLevel == statCoeff[TYPE] ) ? 0 :
        ( ( uiLevel < statCoeff[TYPE] ) ? −1 : 1);
    firstGolombCoeffinCG = false;
}
```

In the above pseudo-code, the term "statCoeff[TYPE]" denotes the statistics gathered for the category of CGs indicated by the variable TYPE.

Another example of a combined approach using the statistics gathering equation described above in which the value of the first coded coefficient level (uiLevel) is compared to a pre-defined function of the statistics (statCoeff), would be as follows.

```
if( firstGolombCoeffinCG )
{
    if ( uiLevel >= 3*( 1 << ( statCoeff[TYPE] /4 )))
        statCoeff[TYPE] ++;
    else if (( 2* uiLevel ) < ( 1 << ( statCoeff(TYPE]/4 )))
        statCoeff[TYPE]--;
    firstGolombCoeffinCG = false;
}
```

Again, in the above pseudo-code, the term "statCoeff [TYPE]" denotes the statistics gathered for the category of CGs indicated by the variable TYPE.

In some examples, a CODEC (i.e., video encoder/decoder) may support multiple methods to determine the TYPE variable for a CG. For example, the CODEC may support two or more of the example functions described above for the TYPE variable. In this case, the CODEC may select one of the methods to determine the manner in which to partition the statistics used for the statistics-based Rice parameter initialization scheme based on a coded or derived indication. Example pseudo-code for the multiple method case is given below.

```
Method1:
    TYPE = 2*isLuma + (isTransformSkip? 0:1);
Method2:
    TYPE = (isTransformSkip? 0:1);
```

In one case, a syntax element may be signaled in a coded bitstream to indicate which characteristics of the transform blocks are used to define the different categories of CGs. The syntax element may comprise a flag included in one of a sequence parameter set (SPS) or a picture parameter set (PPS) for the residual video data. As an example, video encoder 20 may signal the flag (e.g., method_flag) in high level syntax in the coded bitstream, and video decoder 30 may parse the coded bitstream to receive the method_flag. In this example, the method_flag=0 indicates that Method 1 is used to determine the category of the statistics based on whether or not the transform block is a luma block and whether or not the transform block is coded in transform skip mode. The method_flag=1 indicates that Method 2 is used to determine the category of the statistics based only on whether or not the transform block is coded in transform skip mode. If there are more than two methods supported by the CODEC, the syntax element may comprise an index value to indicate the selected method instead of a binary flag.

In another case, the CODEC may select one of the methods used to define the different categories of CGs based on a color format of the video data, in which case additional syntax elements do not need to be signaled in the bitstream to indicate the method. For example, the method used to determine the TYPE variable for a CG of the video data may be selected based on whether the YUV color format or the RGB color format is used to code the video data. As one example, Method 1, which determines the category of the statistics based on whether or not the transform block is a luma block and whether or not the transform block is coded in transform skip mode, is used when the coded video data is in the YUV color format. Method 2, which determines the category of the statistics based only on whether or not the transform block is coded in transform skip mode, is used when the coded video data is in the RGB color format. In the case of video encoder 20 and video decoder 30 being able to detect the color format of the video data, a syntax element, e.g., a method flag or method index) that indicates the selected method is not signaled in the bitstream.

According to the techniques described in this disclosure, the statistics-based Rice parameter initialization scheme determines an initial value of the Rice parameter for a current CG based on the coefficient level statistics gathered for previously coded coefficients in accordance with any combination of the examples described above. Several example techniques of mapping a value of the gathered statistics to the initial value of the Rice parameter for a current CG are described below. The mapping of the statistics to the initial value of the Rice parameter may be performed for each CG (e.g., 4×4 transform block or 4×4 subblock of a transform block), or may be performed only once for each TU (e.g., at the beginning of the TU).

In one example, the value of the statistics may be mapped to the initial Rice parameter according to a stored table. The input of the mapping table may be the value of the statistics and the output of the table may be the initial value of the Rice parameter. In some cases, a clipped version of the statistics may be used as the input to the mapping table. For example, if the maximum Rice parameter is 5 and the statistics are clipped between 0 and 31, then the mapping table may be given as follows.

g_golombTab[32]={0,0,0,0,1,1,2,2,3,3,3,3,3,4,4,4,4,
    4,4,4,4,4,4,5,5,5,5,5,5,5,5};

At the beginning of each CG, the above table may be used to determine the initial value of the Rice parameter based on the gathered statistics. In other examples, different mappings tables may be used to determine the initial value of the Rice parameter based on the gathered statistics.

Three main example methods of statistics gathering are described above, in which the notation "statCoeff" and "m_sumCoeff" may be used interchangeably to denote the statistics: (1) statistics gathering in which the value the coded coefficient level (uiLevel) is compared directly to the value of the statistics (statCoeff), (2) statistics gathering in which the value of the coded coefficient level (uiLevel) is compared to a pre-defined function of the statistics (m_sumCoeff), and (3) statistics gathering in which the value of the coded coefficient level (uiLevel) is compared to a pre-defined function of the statistics (m_sumCoeff) including the total counter variable (m_total_counter).

Using one of the specific example methods of statistics gathering and the mapping table described above, the Rice parameter initialization based on the statistics gathered for the category of CGs indicated by the variable TYPE may be performed as follows.

cRiceParam=g_golombTab[min(statCoeff[TYPE],
        31)];

In other examples, the value of the statistics may be mapped to the initial value of the Rice parameter according to a function that performs the mapping. In some cases, the mapping function may be a function of the gathered statistics. Using a mapping function may avoid the additional storage consumption of the mapping table.

As one example, the Rice parameter may be initialized based on the gathered statistics right-shifted by a constant value, as given below.

cRiceParam=(statCoeff[TYPE]>>R);

In the above equation, ">>" denotes the right-shift operation and R is a parameter. In some cases, it may be desirable to limit the maximum value of the Rice parameter to MAX_RICE, which may be an integer value greater than or equal to 4. In this case, the function may be given as follows.

cRiceParam=min(statCoeff[TYPE]>>R,MAX_RICE)

As another example, the Rice parameter may be initialized based on a linear function of the gathered statistics, as given below.

cRiceParam=a*(statCoeff[TYPE]+b)/c+d

In the above equation, a, b, c and d are parameter values.

As a further example, the Rice parameter may be initialized based on a piecewise linear function of the gathered statistics. Two specific examples of a piecewise linear function are given as follows.

cRiceParam = statCoeff[TYPE] < 16 ? ( statCoeff[TYPE] +1 ) / 4 :
    ( 4 + ( statCoeff[TYPE] + 40 ) / 64 );
cRiceParam = statCoeff[TYPE] < 16 ? ( statCoeff[TYPE] ) / 4 :
    ( 4 + ( statCoeff[TYPE] + 40 ) / 64 );

In another example, the Rice parameter may be initialized based on the method of statistics gathering described above in which the value of the coded coefficient level (uiLevel) is compared to a pre-defined function of the statistics (m_sumCoeff). In this case, the value of the gathered statistics is mapped to the initial value of the Rice parameter according to a function of the statistics. In one example, the function of the statistics used to initialize the Rice parameter may be based on a selection of a minimum of either a maximum value of the Rice parameter or the value of the statistics divided by a constant value.

An example of the mapping function is given as follows.

uiGoRiceParam=min(m_sumCoeff/DELAY,MAX_RI-
        CE_PARAM_INIT);

In the above equation, DELAY is the constant value and MAX_RICE_PARAM_INIT is the maximum value of the Rice parameter. In some cases, the maximum value of the Rice parameter may be greater than or equal to 4. The constant value may be a user defined parameter. An example of the mapping function with DELAY=4 is given as follows.

cRiceParam=Min(maxRicePara,statCoeff/4).

In the above example, the term "statCoeff" is used to denote the value of the statistics instead of "m_sumCoeff," and maxRicePara is used to denote the maximum value of the Rice parameter instead of MAX_RICE_PARAM_INIT.

In a further example, the Rice parameter may be initialized based on the method of statistics gathering described above in which the value of the coded coefficient level (uiLevel) is compared to a pre-defined function of the statistics (m_sumCoeff) including the total counter variable (m_total_counter). In this case, the value of the gathered statistics is mapped to the initial value of the Rice parameter according to a function of the statistics. An example of the mapping function is given as follows.

If $m\_sumCoeff/m\_total\_counter > thres0, cRiceParam += k0$

Elseif $m\_sumCoeff/m\_total\_counter < thres1, cRiceParam += k1$

In the above equation, the term "thres0" denotes a first threshold value and "thres1" denotes a second threshold value, and k0 and k1 are parameters. According to the function, if the value of the statistics divided by the total number of statistics updates is greater than thres0, then the initial value of the Rice parameter is set equal to a previous value of the Rice parameter incremented by k0. If the value of the statistics divided by the total number of statistics updates is less than thres1, then the initial value of the Rice parameter is set equal to a previous value of the Rice parameter incremented by k1.

In some examples, the initial Rice parameter may be clipped between a minimum value and a maximum value. In this case, an extra clipping function would be added to the mapping function used to initialize the Rice parameter. An example of a clipped mapping function is given as follows.

$cRiceParam = Clip(MIN\_RICE, cRiceParam, MAX\_RICE)$

In the above equation, MIN_RICE is the minimum value of the Rice parameter and MAX_RICE is the maximum value of the Rice parameter. In one example, the value of MIN_RICE may be equal to 0 and the value of MAX_RICE may be an integer value greater than or equal to 4. The values of MIN_RICE and MAX_RICE may be dependent on side information, such as one or more of bit-depth, profile, color format, coding mode (i.e., lossless coding or lossy coding), and other types of side information.

As described above, in HEVC, a value of the Rice parameter may be updated after coding each remaining absolute value of coefficient levels in a CG. In some examples, a similar clipping may be applied to the updated value of the Rice parameter. The range (i.e., the minimum value and the maximum value) may be different for the update procedure than for the initialization procedure, or the range may be the same as the range used for initialization. Similarly, the range may be dependent on one or more of bit-depth, profile, color format, coding mode (i.e., lossless coding or lossy coding), and other side information.

Four additional examples of mapping the statistics to the initial value of the Rice parameter are given below.

In a first example, two statistics referred to as m_sumCoeff and m_sumCoeff2 are used. The value of m_sumCoeff may be derived using the method of statistics gathering described above in which the value of the coded coefficient level (uiLevel) is compared to a pre-defined function of the statistics (m_sumCoeff), as follows.

```
if ( uiLevel >= 3*( 1 << ( m_sumCoeff/DELAY )))
{
    m_sumCoeff++;
}
else if (( 2* uiLevel ) < ( 1 << ( m_sumCoeff/DELAY )))
{
    m_sumCoeff--;
}
```

The value of m_sumCoeff2 may be derived using the statistics gathering method described above in which the value of the coded coefficient level (uiLevel) is compared directly to the value of the statistics (m_sumCoeff2), as follows.

$m\_sumCoeff2 += (uiLevel == m\_sumCoeff2)?0:$ $(uiLevel < m\_sumCoeff2?-1:1);$

In this first example, the mapping of the statistics to the initial value of the Rice parameter may be different for a transform coded block than for a transform skip block. In the case of a transform skip block, the initialization function may be given as follows.

$uiGoRiceParam = min(m\_sumCoeff/DELAY, MAX\_RICE\_PARAM\_INIT);$

In the case of a transform coded block, the initialization function may be given as follows.

```
if m_sumCoeff2 < Th,
    uiGoRiceParam=min( m_sumCoeff/DELAY + 1,
        MAX_RICE_PARAM_INIT);
else
    uiGoRiceParam=min(m_sumCoeff/DELAY,
        MAX_RICE_PARAM_INIT);
```

In the above pseudo-code, "Th" is a threshold. An example value of Th may be (1<<uiGoRiceParam).

In a second example, the statistics, referred to as m_sumCoeff, may be derived using the method of statistics gathering described above in which the value of the coded coefficient level (uiLevel) is compared to a pre-defined function of the statistics (m_sumCoeff). In this second example, the mapping of the statistics to the initial value of the Rice parameter may be different for a transform coded block than for a transform skip block. In the case of a transform skip block, the initialization function may be given as follows.

$uiGoRiceParam = min(m\_sumCoeff/DELAY, MAX\_RICE\_PARAM\_INIT);$

In the case of a transform coded block, the initialization function may be given as follows.

```
if m_sumCoeff < Th,
    uiGoRiceParam=min( m_sumCoeff/DELAY,
        MAX_RICE_PARAM_INIT);
else
    uiGoRiceParam=min( m_sumCoeff/DELAY + 1,
        MAX_RICE_PARAM_INIT );
```

In the above pseudo-code, "Th" is a threshold. An example value of Th may be MAX_RICE_PARAM_INIT/2-2.

In a third example, the statistics, referred to as m_sumCoeff, may be derived using the method of statistics gathering described above in which the value of the coded coefficient level (uiLevel) is compared to a pre-defined function of the statistics (m_sumCoeff). In this third example, the mapping of the statistics to the initial value of the Rice parameter may be given as follows.

```
if ( m_sumCoeff < Th )
    uiGoRiceParam=min(( m_sumCoeff + d ) / DELAY,
        MAX_RICE_PARAM_INIT );
else
    uiGoRiceParam=min(( m_sumCoeff ) / DELAY,
        MAX_RICE_PARAM_INIT );
```

In the above pseudo-code, "Th" is a threshold and "d" is a parameter.

In a fourth example, the statistics, referred to as m_sumCoeff, may be derived using the method of statistics gathering described above in which the value of the coded coefficient level (uiLevel) is compared to a pre-defined function of the statistics (m_sumCoeff). In this fourth example, the mapping of the statistics to the initial value of the Rice parameter may be given as follows.

```
if ( m_sumCoeff < Th )
    uiGoRiceParam=min(( m_sumCoeff ) / DELAY0,
        MAX_RICE_PARAM_INIT);
else
    uiGoRiceParam=min( d + ( m_sumCoeff ) / DELAY1,
        MAX_RICE_PARAM_INIT);
```

In the above pseudo-code, "Th" is a threshold and "d," DELAY0 and DELAY1 are parameters. In this fourth example, when the value of the statistics is equal to the threshold (Th), the initial value of the Rice parameter (uiGoRiceParam) derived using either of the above equations is the same.

In some examples, the mapping function used to determine the initial value of the Rice parameter and the threshold values may be fixed and known to both video encoder 20 and video decoder 30. In other examples, the mapping function used to determine the initial value of the Rice parameter and the threshold values may be adaptively decided based on side information. The side information may be derived independently by each of video encoder 20 and video decoder 30, or the side information may be signaled from video encoder 20 to video decoder 30 using high level syntax in either the SPS or PPS, or some combination of derivation and signaling may be used to determine the side information. For example, the side information may include one or more of frame size, frame type, CU size, TU size, TU type (e.g., transform skip mode or transform mode), color component, intra- or inter-prediction mode, quantization parameter (QP), bit-depth, color format (e.g., 444/422/420), the significant coefficient flags (both number and distribution), the greater than 1 (i.e., larger than 1) flags (both number and distribution), and the greater than 2 (i.e., larger than 2) flags (both number and distribution). They also may be explicitly signaled.

After initializing the Rice parameter for a current CG, the initial value of the Rice parameter may be updated after coding a remaining absolute value of a coefficient level for at least one coefficient in the current CG using codes, e.g., Golomb-Rice codes or Exponential-Golomb codes, defined by the Rice parameter. The statistics for the statistics-based Rice parameter initialization scheme may be determined based on one or more coefficient levels in the current CG either before or after updating the value of the Rice parameter.

In some examples, the statistics may be based on a comparison or calculation of the coded coefficient levels in the current CG and a current value of the Rice parameter for the current CG. One example of the statistics that are based on the coefficient levels and the Rice parameter value is given as follows.

```
if( absCoeff[idx] > 3*( 1 << uiGoRiceParam ))
{
    UndershootCnt ++
}
else if ((( absCoeff[ idx ] − baseLevel ) * s ) < ( 1 << uiGoRiceParam ))
{
    OvershootCnt ++;
}
TotalCnt ++;
```

In the above pseudo-code, "UndershootCnt," "OvershootCnt" and "TotalCnt" denote the statistics that will be used to initialize the Rice parameter. In addition, "uiGoRiceParam" denotes the value of the Rice parameter, "s" is a parameter, and absCoeff[idx] is the absolute value of the coefficient level for a coefficient at index idx.

In some examples, the statistics may be determined before updating the value of the Rice parameter. In this case, the un-updated value of the Rice parameter is used in the comparison or calculation used to determine the statistics. An example combination of determining the statistics based on coefficient levels and the un-updated value of the Rice parameter, and then updating the value of the Rice parameter is given as follows.

```
if( absCoeff[idx] > 3*( 1 << uiGoRiceParam ))
{
    UndershootCnt ++
}
else if ((( absCoeff[ idx ] − baseLevel) * s ) < ( 1 << uiGoRiceParam ))
{
    OvershootCnt ++;
}
TotalCnt ++;
if ( absCoeff[idx] > 3*( 1 << uiGoRiceParam ))
{
    uiGoRiceParam = min<UInt>( uiGoRiceParam+ 1,
        MAX_RICE_PARAM );
}
```

In the above pseudo-code, "MAX_RICE_PARAM" denotes a maximum value of the Rice parameter, and min<UInt>( ) is a function that selects a minimum value. In some examples, the maximum value of the Rice parameter may be equal to an integer value of at least 4. In other examples, the statistics may be determined after updating the value of the Rice parameter. In this case, the updated value of the Rice parameter is used in the comparison or calculation used to determine the statistics.

In some examples, the update of the statistics for the statistics-based Rice parameter initialization scheme described above may be integrated with the update of the Rice parameter. As discussed above, in HEVC, the initial value of the Rice parameter may be conditionally updated based on the initial value of the Rice parameter and an absolute value of the coefficient level for the coefficient being coded in the current CG. The value of the Rice parameter may continue to be conditionally updated after coding each remaining absolute level for coefficients in the current CG. The HEVC conditional update scheme is given as follows.

```
if( absCoeff[idx] > 3*( 1 << uiGoRiceParam ))
{
    uiGoRiceParam = min<UInt>( uiGoRiceParam+ 1,
        MAX_RICE_PARAM );
}
```

In the above pseudo-code, "uiGoRiceParam" denotes the value of the Rice parameter, absCoeff[idx] is the absolute value of the coefficient level for a coefficient at index idx, "MAX_RICE_PARAM" denotes a maximum value of the Rice parameter, and min<UInt>( ) is a function that selects a minimum value.

In some examples, the update of the statistics used to initialize the value of the Rice parameter at the beginning of a subsequent CG may be integrated with the Rice parameter update based on the coefficient levels of the current CG. An example of the integrated updating of the statistics and the Rice parameter value is as follows.

```
if( absCoeff[idx] > 3*( 1 << uiGoRiceParam ))
{
    UndershootCnt ++
    uiGoRiceParam = min<UInt>( uiGoRiceParam+ 1,
    MAX_RICE_PARAM );
}
```

In the above pseudo-code, "UndershootCnt++" denotes the update of the statistics.

In some examples, an updated value of the Rice parameter (or a delta value compared to a predictor, e.g., the current value of the Rice parameter) for the next coding unit (e.g., 4×4 CG, TU, or CU) is calculated based on part or all of the parameters used for the statistics. For instance, in one example, the higher the value of OvershootCnt, the smaller the value of the updated Rice parameter. In another example, the higher the value of UndershootCnt, the larger the value of the updated Rice parameter.

Several examples of initializing the Rice parameter for each CG based on bit-depth or another characteristic of the video data are described below. In these examples, the initialization of Rice parameter for each CG is not dependent on the gathered statistics. As in the statistics-based Rice parameter initialization scheme described above, the Rice parameter initialization may be performed for each CG (e.g., 4×4 transform block or 4×4 subblock of a transform block), or may be performed only once for each TU (e.g., at the beginning of the TU).

In one example, the initial value of the Rice parameter may instead be based on the bit-depth of the video data. The following is an example where the initial value of the Rice parameter, cRiceParam, for each CG is a function of the bit-depth of the current component (e.g., the luma component or one of the chroma components) of the CG.

$cRiceParam = max(0, bitDepth - n)$

In the above equation, bitDepth is the bit-depth of the current component, and n is a parameter. In one example, the parameter n may be set equal to 9.

In another example, the initial value of the Rice parameter, cRiceParam, for each CG may be dependent on the component type of the CG (e.g., luma or chroma). In another example, the initial value of the Rice parameter, cRiceParam, for each CG may be dependent on whether or not the current block is coded in the transform-quantization bypass mode in which both the transform and the quantization are skipped. In another example, the initial value of the Rice parameter, cRiceParam, for each CG may be dependent on whether or not the current block is coded in the transform skip mode in which the transform is skipped but the quantization may be applied. In another example, the initial value of the Rice parameter, cRiceParam, for each CG may be dependent on the quantization parameter (QP) for the TU. In another example, the initial value of the Rice parameter, cRiceParam, for each CG may be dependent on the color component and/or the color space of the video data.

In another example, the initial value of the Rice parameter, cRiceParam, for each CG may be dependent on one or more of the CU size, the TU size, the frame resolution, the frame rate, the prediction mode (e.g., Intra, Inter, IntraBC (intra-block copy)), the frame type, and the mode and weight of cross-component residue prediction. Examples of the mode and weight of cross-component residue prediction are described in U.S. provisional application No. 61/846,581, filed Jul. 15, 2013, U.S. provisional application No. 61/847,839, filed Jul. 18, 2013, U.S. provisional application No. 61/826,396, filed May 22, 2013, and U.S. provisional application No. 61/838,152, filed Jun. 21, 2013.

The following provides some background information about the coeff_abs_level_greater1 flag and the coeff_abs_level_greater2 flag using HEVC as an example. In HEVC, for a CG (e.g., a 4×4 subblock), the significance map is first coded to indicate the positions of coefficients with non-zero coefficient levels. Then, for the positions having significant coefficients, the coeff_abs_level_greater1 flag may be encoded to indicate whether the absolute value of the coefficient is larger than 1. For positions with coeff_abs_level_greater1=1, the coeff_abs_level_greater2 flag may be encoded to indicate whether the absolute value of the coefficient is larger than 2.

In some examples, the initial value of the Rice parameter, cRiceParam, for each CG may be dependent on the number of previously coded coefficient levels with significant (i.e., non-zero) values, which may be indicated by the coding of the coeff_abs_level_greater1 flag equal to either 0 or 1, and/or the number of previously coded coefficient levels with values greater than 1, which may be indicated by the coding the coeff_abs_level_greater2 flag equal to either 0 or 1. In other examples, the initial value of the Rice parameter, cRiceParam, for each CG may be dependent on the number of previously coded coefficient levels that have values greater than 1, which is indicated by coding coeff_abs_level_ greater1=1, and/or the number of previously coded coefficient levels that have values greater than 2, which is indicated by coding coeff_abs_level_greater2=1.

In another example, the initial value of the Rice parameter, cRiceParam, for each CG may be dependent on any combination of the above examples. Two detailed examples of determining the initial value of the Rice parameter based on the bit-depth of the video data are given below.

Example 1

```
offset = ( iQP + 6*( BD - 12) + 12 ) / 6
if (transform_skip_flag || cu_transquant_bypass_flag)
    uiGoRiceParam = Max (BD - 8 - offset) , 0 )
else
    uiGoRiceParam = Max (( BD - 8 ) >> 1 - offset), 0 )
```

In the above pseudo-code, iQP is the QP value and BD is the bit-depth of the video data. In this first example, the initial value of the Rice parameter is set based on the first equation when the CG is included in a transform block coded in either the transform skip mode or the transform-quantization bypass mode, and is set based on the second equation when the CG is included in a transform coded block. In either case, the initial value is determined based on the bit-depth (BD) of the video data.

Example 2

```
offset = 8 − Gr1
if (transform_skip_flag || cu_transquant_bypass_flag)
    uiGoRiceParam = Max ( BD − 8 − offset ) , 0 )
else
    uiGoRiceParam = Max (( BD − 8 ) >> 1 − offset ), 0 )
```

In the above pseudo-code, Gr1 is the number of coeff_abs_level_greater1 flags that are coded and BD is the bit-depth of the video data. In this second example, the initial value of the Rice parameter is set based on the first equation when the CG is included in a transform block coded in either the transform skip mode or the transform-quantization bypass mode, and is set based on the second equation when the CG is included in a transform coded block. In either case, the initial value is determined based on the bit-depth (BD) of the video data.

An example of a hybrid scheme that combines Rice parameter initialization for each CG according to any combination of the examples described above with explicit signaling of offset values is described below. For example, an offset used to initialize the Rice parameter at the beginning of a CG may be decomposed into a summation of two parts: (1) a constant offset and (2) an adaptive offset. The adaptive offset may be derived using one or more of the example techniques described in this disclosure. The constant offset may be signaled in the bitstream from video encoder 20 to video decoder 30.

As another example, to combine explicit Rice parameter signaling with the initial Rice parameter derivation process described in this disclosure, the determining of whether to signal the Rice parameter may be dependent on the derived value of the initial Rice parameter at video encoder 20. For example, if the derived value of the initial Rice parameter is similar to a pre-defined value (e.g., the difference between the derived value and a threshold is smaller than the threshold), the Rice parameter may not be signaled to video decoder 30, but may instead be derived as described above. In this case, either the derived value or the pre-defined value may be used as the initial value of the Rice parameter. Otherwise, the initial value of the Rice parameter may be signaled, or the difference between the initial value of the Rice parameter and the pre-defined value may be signaled. Some additional examples of the signaling techniques can be found in U.S. provisional application No. 61/870,120, filed Aug. 26, 2013, U.S. provisional application No. 61/880,616, filed Sep. 20, 2013, and U.S. provisional application No. 61/889,654, filed Oct. 11, 2013.

Several additional examples and considerations with respect to the above described examples of the Rice parameter initialization scheme are described below. Although the techniques of the disclosure may be primarily described individually and/or as part of a specific combinations with other techniques, any two or more of the techniques described in this disclosure may be combined with one another. In addition, it may be possible for any one of the techniques described in this disclosure to be implemented separately.

For the lossy coding case, the statistics-based Rice parameter initialization scheme may be applied only to transform skip blocks, as shown in the following conditional equation. On the other hand, when a transform is applied to the transform block, the Rice parameter is initialized to zero in accordance with the HEVC initialization scheme.

$$cRiceParam = isTransformSkip?0:g\_golombTab[min(statCoeff[TYPE],31)];$$

In other examples, the statistics-based Rice parameter initialization scheme may be applied only to transform skip blocks, but it may not be necessary to automatically initialize the Rice parameter to zero when a transform is applied to the block, as shown in the following equation.

$$cRiceParam = isTransformSkip ? max(cRiceParam-1, 0) : g\_golombTab[min(statCoeff[TYPE], 31)];$$

In some examples, the HEVC Rice parameter update scheme performed within a CG may be disabled. Instead, the initial value of the Rice parameter may be determined in accordance with any combination of the example techniques described above, and the initial value of the Rice parameter may then be used throughout the block. In other examples, a different Rice parameter update scheme may be performed within the CG. In some cases, one or more of the example techniques described above may be used to perform the Rice parameter update and statistics update according to a given order or as integrated methods throughout the block. Also, in some cases, one or more of the example techniques described above may be used to perform bit-depth dependent initialization of the Rice parameter throughout the block.

Although the example methods of determining an initial value of the Rice parameter are described separately above, the techniques of this disclosure are not so limited. In general, various combinations of the example techniques described above may be possible. The example methods described above may also be implemented separately. In addition, all of the methods described above or their combinations may be applied to CGs within all transform blocks or only transform blocks for which a transform is skipped or bypassed.

Figure 5:
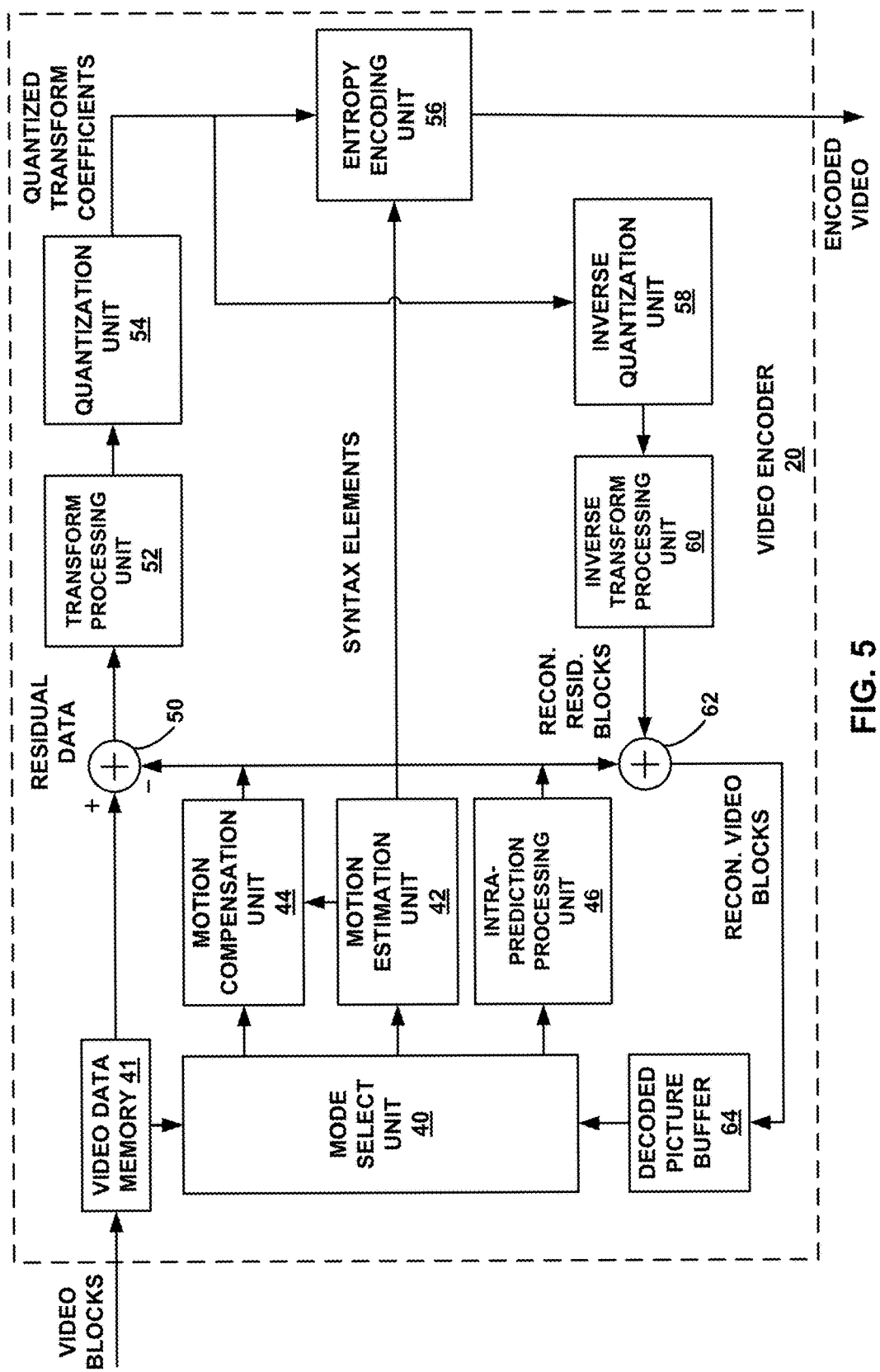
FIG. 5 is a block diagram illustrating an example video encoder that may implement the techniques for encoding coefficient levels described in this disclosure.

FIG. 5 is a block diagram illustrating an example of video encoder 20 that may implement the techniques for encoding coefficient levels described in this disclosure. Video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (1-mode) may refer to any of several spatial-based video compression modes. Inter-modes such as uni-directional prediction (P-mode) or bi-directional prediction (B-mode) may refer to any of several temporal-based video compression modes.

As shown in FIG. 5, the video encoder 20 receives a current video block within a video frame to be encoded. In the example of FIG. 5, the video encoder 20 includes a mode select unit 40, a video data memory 41, a motion compensation unit 44, a motion estimation unit 42, an intra-prediction processing unit 46, a decoded picture buffer (DPB) 64, a summer 50, a transform processing unit 52, a quantization unit 54, and an entropy encoding unit 56. The transform processing unit 52 illustrated in FIG. 5 is the unit that applies the actual transform or combinations of transform to a block of residual data, and is not to be confused with a block of transform coefficients, which also may be referred to as a transform unit (TU) of a CU. For video block reconstruction, the video encoder 20 also includes an inverse quantization unit 58, an inverse transform processing unit 60, and a summer 62. A deblocking filter (not shown in FIG. 5) may also be included to filter block boundaries to remove blockiness artifacts from reconstructed video. If desired, the deblocking filter would typically filter the output of the summer 62.

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction processing unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference picture. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, the intra-prediction processing unit 46 may perform intra-prediction encoding of a block in a P- or B-frame, e.g., when the motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference picture stored in decoded picture buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction processing unit 46 may intra-predict the received block, as an alternative to inter-prediction performed by the motion estimation unit 42 and the motion compensation unit 44. The intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction processing unit 46 may be configured with a variety of different intra-prediction modes. For example, the intra-prediction processing unit 46 may be configured with a certain number of directional prediction modes, e.g. thirty-three directional prediction modes, based on the size of the CU being encoded.

The intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction processing unit 46 may calculate an error value for the prediction mode based on pixel differences between the PU and the received block to be encoded. The intra-prediction processing unit 46 may continue testing intra-prediction modes until an intra-prediction mode that yields an acceptable error value is discovered. The intra-prediction processing unit 46 may then send the PU to the summer 50.

The video encoder 20 forms a residual block by subtracting the prediction data calculated by the motion compensation unit 44 or the intra-prediction processing unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform processing unit 52 may form one or more transform units (TUs) from the residual block. The transform processing unit 52 selects a transform from among a plurality of transforms. For example, transform processing unit 52 may select one of a discrete cosine transform (DCT), a discrete sine transform (DST), an integer transform, a Karhunen-Loeve (K-L) transform, or another transform to produce transform coefficients. The transform may be selected based on one or more coding characteristics, such as block size, coding mode, or the like. The transform processing unit 52 then applies the selected transform to the TU, producing a video block comprising a two-dimensional array of transform coefficients. The transform processing unit 52 may send the resulting transform coefficients to the quantization unit 54. The quantization unit 54 may then quantize the transform coefficients.

The entropy encoding unit 56 may then perform a scan of the coefficients in the matrix according to a scanning mode. In the case of lossy coding, the coefficients may be quantized transform coefficients. In the case of lossless coding or lossy coding with transform skipping or bypass, the coefficients may be coefficients that have not been transformed or quantized. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CABAC, syntax-based context-adaptive binary arithmetic coding (SBAC), Probability Interval Partitioning Entropy (PIPE), or another entropy coding methodology to the coefficients. Entropy encoding unit 56 may be configured to code the coefficients according to the techniques of this disclosure. In the example of CABAC, entropy encoding unit 56 may encode the coefficients using either regular coding mode or bypass mode. To perform CABAC, the entropy encoding unit 56 may select a context model to apply a certain context to encode symbols to be transmitted. The context may relate to, for example, whether neighboring values are non-zero or not. Entropy encoding unit 56 may select the context model used to encode these symbols based on, for example, an intra-prediction direction for intra-prediction modes, a scan position of the coefficient corresponding to the syntax elements, block type, and/or transform type, among other factors used for context model selection.

Entropy encoding unit 56 encodes coefficient levels of residual video data into a bitstream for transmission to a video decoder or a storage device. In the case of lossless video coding or lossy video coding with transform skipping or bypass, the coefficients to be encoded may have coefficient levels with large absolute values. When the coefficients represent screen content, which may include graphics and text regions, the content may not be well predicted resulting in large absolute values of coefficient levels for the coefficients to be encoded.

Entropy encoding unit 56 encodes a remaining absolute value (e.g., coeff_abs_level_remaining or levelRem) of a coefficient level for at least one coefficient in a current coefficient group (CG) in the bypass mode of CABAC or another entropy coding engine using codes defined by a Rice parameter. According to the techniques of this disclosure, entropy encoding unit 56 is configured to determine an initial value of the Rice parameter for the current CG based on statistics of coefficient levels for previously encoded coefficients. The statistics may be statistics of absolute values of coefficient levels or remaining absolute values of coefficient levels of previously coded coefficients. The statistics-based Rice parameter initialization scheme described in this disclosure allows the Rice parameter to quickly and efficiently adapt to large coefficient values, which may occur in blocks of screen content and blocks with transform skipping or bypass.

In one example, entropy encoding unit 56 may be configured to determine the statistics by comparing a coefficient level for a given previously encoded coefficient to a function of the statistics, and then determine whether to increase or decrease a value of the statistics based on the comparison. A value of the statistics may be initialized to zero at a beginning of each slice of the video data, and entropy encoding unit 56 may update the statistics once per CG of the slice. In some examples, entropy encoding unit 56 may be configured to determine separate statistics for each of a plurality of different categories of CGs. The categories may be defined based on characteristics of the transform blocks that include the CGs, such as whether or not the transform blocks are luma blocks and whether or not the transform blocks are transform skip blocks, for example.

At the beginning of the current CG, entropy encoding unit 56 is configured to map the value of the statistics to the initial value of the Rice parameter for the current CG. In one example, entropy encoding unit 56 may map the value of the statistics to the initial Rice parameter value according to a function of the statistics that is based on a selection of a minimum of either a maximum value of the Rice parameter or the value of the statistics divided by a constant value. Example equations representing statistics gathering, statistics partitioning, and statistics mapping procedures for the Rice parameter initialization scheme are described in more detail above.

Following the entropy coding by the entropy encoding unit 56, the resulting encoded video may be transmitted to another device, such as the video decoder 30, or archived for later transmission or retrieval. In some cases, the entropy encoding unit 56 or another unit of the video encoder 20 may be configured to perform other coding functions, in addition to entropy coding.

Inverse quantization unit 58 and inverse transform processing unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the reference pictures of decoded picture buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in decoded picture buffer 64. The reconstructed video block may be used by the motion estimation unit 42 and the motion compensation unit 44 as a reference block to inter-code a block in a subsequent video frame.

Figure 6:
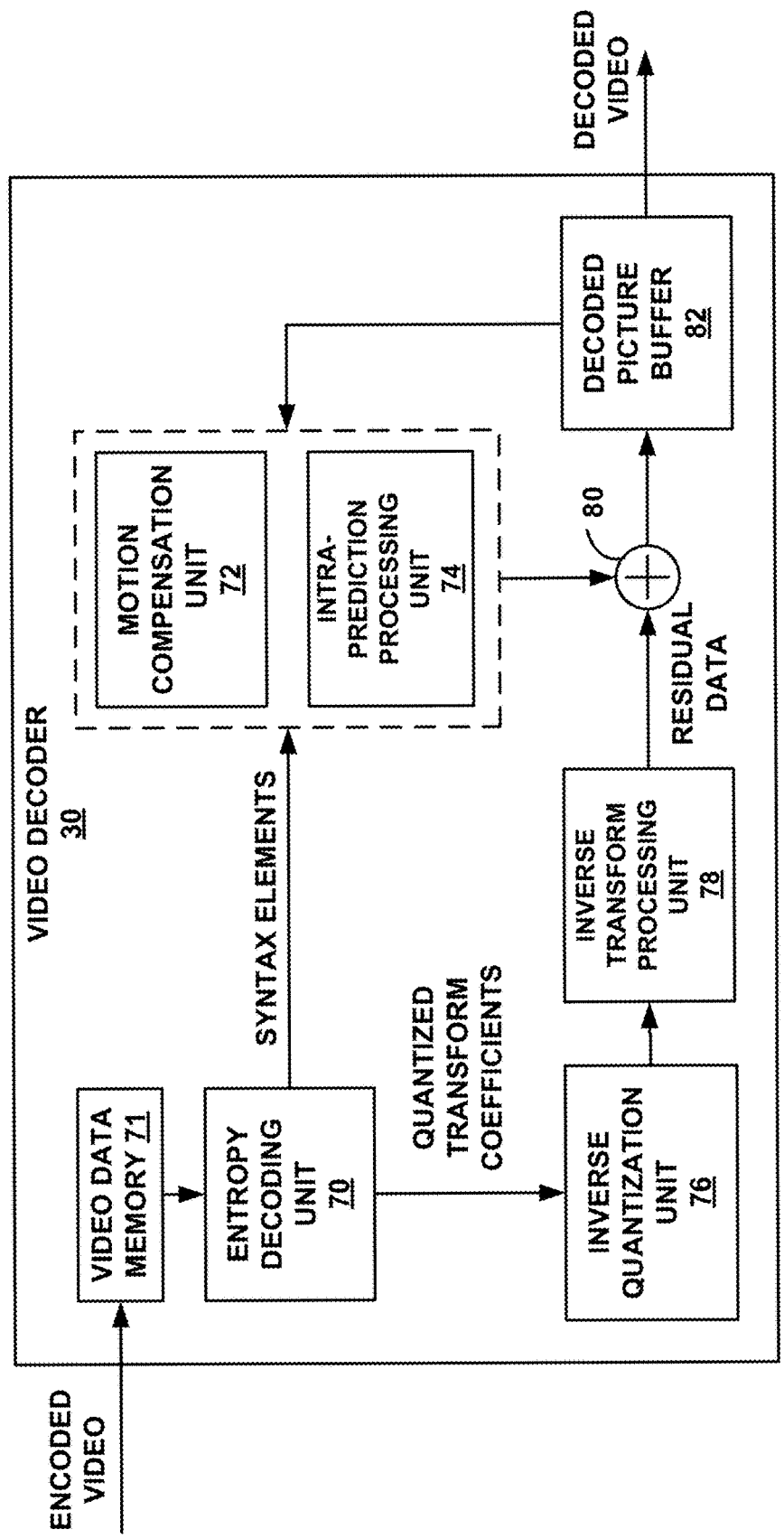
FIG. 6 is a block diagram illustrating an example video decoder that may implement the techniques for decoding coefficient levels described in this disclosure.

FIG. 6 is a block diagram illustrating an example of video decoder 30 that may implement the techniques for decoding coefficient levels described in this disclosure. In the example of FIG. 6, the video decoder 30 includes an entropy decoding unit 70, a video data memory 71, a motion compensation unit 72, an intra-prediction processing unit 74, an inverse quantization unit 76, an inverse transform processing unit 78, a decoded picture buffer (DPB) 82 and a summer 80. The video decoder 30 may, in some examples, perform a decoding pass generally reciprocal to the encoding pass described with respect to the video encoder 20 (see FIG. 5).

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

Entropy decoding unit 70 performs an entropy decoding process on the encoded bitstream to retrieve a one-dimensional array of residual video data coefficients. The entropy decoding process used depends on the entropy coding used by the video encoder 20 (e.g., CABAC). The entropy coding process used by the encoder may be signaled in the encoded bitstream or may be a predetermined process. Entropy decoding unit 70 may be configured to decode the coefficients according to the techniques of this disclosure. In the example of CABAC, entropy decoding unit 70 may decode the coefficients using either regular coding mode or bypass mode.

In some examples, entropy decoding unit 70 may scan the received values using a scan that mirrors the scanning mode used by the entropy encoding unit 56 of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

Entropy decoding unit 70 decodes coefficient levels of the residual video data coefficients from the bitstream in a reciprocal manner to video encoder 20. In the case of lossy video coding, the coefficients to be decoded may be quantized transform coefficients. In the case of lossless video coding or lossy video coding with transform skipping or bypass, the coefficients to be decoded may be encoded pixel values and have coefficient levels (i.e., pixel values) with large absolute values. When the coefficients represent screen content, which may include graphics and text regions, the content may not be well predicted, resulting in large absolute values of coefficient levels for the coefficients to be decoded.

Entropy decoding unit 70 decodes a remaining absolute value of a coefficient level for at least one coefficient in a coefficient group (CG) using codes defined by a Rice parameter. According to the techniques of this disclosure, entropy decoding unit 70 is configured to determine an initial value of the Rice parameter for the current CG based on statistics of coefficient levels for previously decoded coefficients. The statistics may be statistics of absolute values of coefficient levels or remaining absolute values of coefficient levels of previously decoded coefficients. The statistics-based Rice parameter initialization scheme described in this disclosure allows the Rice parameter to quickly and efficiently adapt to large coefficient values, which may occur in blocks of screen content and blocks with transform skipping or bypass.

In one example, entropy decoding unit 70 may be configured to determine the statistics by comparing a coefficient level for a given previously decoded coefficient to a function of the statistics, and then determine whether to increase or decrease a value of the statistics based on the comparison. A value of the statistics may be initialized to zero at a beginning of each slice of the video data, and entropy decoding unit 70 may update the statistics once per CG of the slice. In some examples, entropy decoding unit 70 may be configured to determine separate statistics for each of a plurality of different categories of CGs. The categories may be defined based on characteristics of the transform blocks that include the CGs, such as whether or not the transform blocks are luma blocks and whether or not the transform blocks are transform skip blocks, for example.

At the beginning of the current CG, entropy decoding unit 70 is configured to map the value of the statistics to the initial value of the Rice parameter for the current CG. In one example, entropy decoding unit 70 may map the value of the statistics to the initial Rice parameter value according to a function of the statistics that is based on a selection of a minimum of either a maximum value of the Rice parameter or the value of the statistics divided by a constant value. Example equations representing statistics gathering, statistics partitioning, and statistics mapping procedures for the Rice parameter initialization scheme are described in more detail above.

The inverse quantization unit 76 inverse quantizes, i.e., de-quantizes, quantized transform coefficients provided in the bitstream and decoded by entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. Inverse quantization unit 76 may inverse quantize the transform coefficients either before or after the coefficients are converted from a one-dimensional array to a two-dimensional array.

Inverse transform processing unit 78 applies an inverse transform to the inverse quantized transform coefficients. For example, inverse transform processing unit 78 may apply one of a discrete cosine transform (DCT), a discrete sine transform (DST), an integer transform, a Karhunen-Loeve (K-L) transform, or another transform to produce residual data. In some examples, inverse transform processing unit 78 may determine an inverse transform based on signaling from video encoder 20, or by inferring the transform from one or more coding characteristics such as block size, coding mode, or the like. In some examples, inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, inverse transform processing unit 78 may apply a cascaded inverse transform, in which inverse transform processing unit 78 applies two or more inverse transforms to the transform coefficients of the current block being decoded.

Intra-prediction processing unit 74 may generate prediction data for a current block of a current frame based on a signaled intra-prediction mode and data from previously decoded blocks of the current frame.

Motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on. Based on the retrieved motion prediction direction, reference frame index, and motion vector, motion compensation unit 72 produces a motion compensated block for the current portion. These motion compensated blocks essentially recreate the predictive block used to produce the residual data.

Motion compensation unit 72 may produce the motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Additionally, motion compensation unit 72 and intra-prediction processing unit 74, in an HEVC example, may use some of the syntax information (e.g., provided by a quadtree) to determine sizes of LCUs used to encode frames of the encoded video sequence. Motion compensation unit 72 and intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. If desired, a deblocking filter may also be applied to filter the decoded blocks in order to remove blockiness artifacts. The decoded video blocks are then stored in decoded picture buffer 82, which provides reference blocks for subsequent motion compensation and also produces decoded video for presentation on a display device (such as the display device 32 of FIG. 1).

Figure 7:
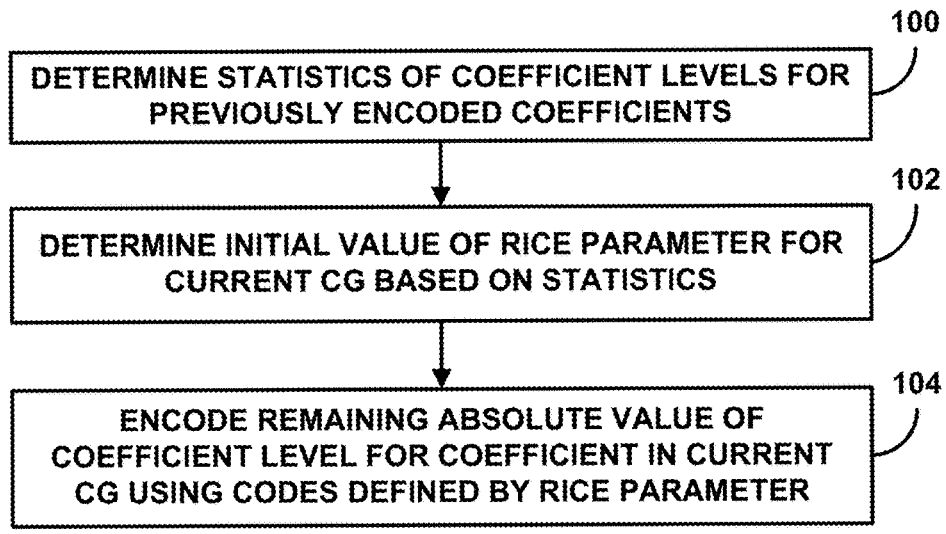
FIG. 7 is a flowchart illustrating an example operation of determining an initial value of a Rice parameter during entropy encoding of coefficient levels according to techniques described in this disclosure.

FIG. 7 is a flowchart illustrating an example operation of determining an initial value of a Rice parameter during entropy encoding of coefficient levels according to techniques described in this disclosure. The example operation is described with respect to video encoder 20 including entropy encoding unit 56 from FIG. 5.

Entropy encoding unit 56 receives coefficients of residual video data to be encoded into a bitstream for transmission to video decoder 30 or for storage on storage medium 34 or file server 36. The residual video data coefficients may be included in coefficient groups (CGs), each of which is a subblock of a transform block (e.g. a 4×4 subblock as illustrated in FIG. 4). During encoding of the coefficients in the CGs, entropy encoding unit 56 determines statistics of coefficient levels for the previously encoded coefficients (100). In the example described in more detail below with respect to FIG. 9, determining the statistics of the coefficients levels for the previously encoded coefficients may comprise determining whether to increase or decrease a value of the statistics based on a comparison of a coefficient level for one or more of the previously encoded coefficients to a function of the statistics. A value of the statistics may be initialized to zero at a beginning of each slice of the residual video data.

In some examples, determining the statistics of the coefficient levels for the previously encoded coefficients may comprise calculating an average or a running average of the coefficient levels over a slice or a coding unit (CU) of the residual video data. In other examples, determining the statistics of the coefficient levels for the previously encoded coefficients may comprise determining whether to increase, decrease, or maintain a value of the statistics based on a comparison of a coefficient level for one of the previously encoded coefficients to the value of the statistics.

The statistics of the coefficient levels may include statistics of absolute values of the coefficient levels or statistics of remaining absolute values of the coefficient levels for the previously encoded coefficients. The statistics of the coefficient levels may be gathered for previously encoded coefficients in CGs that are all included in the same transform block, or for previously encoded coefficients in CGs that are included in two or more different transform blocks.

In some examples, entropy encoding unit 56 may determine the statistics of the coefficient levels for the previously encoded coefficients once per coefficient group. The frequency of the statistics gathering is described in more detail below with respect to FIG. 9. For example, entropy encoding unit 56 may determine the statistics when a first absolute value of a coefficient level is encoded in each of the previous CGs. Alternatively, entropy encoding unit 56 may determine the statistics when a first remaining absolute value of a coefficient level is encoded in each of the previous CGs. In other examples, entropy encoding unit 56 may determine the statistics of the coefficient levels for the previously encoded coefficients upon encoding each of the coefficients.

In addition, as described in more detail below with respect to FIG. 9, entropy encoding unit 56 may determine separate statistics for each of a plurality of different categories of CGs. The categories may be defined based on characteristics of the transform blocks that include the CGs. For example, the characteristics of the transform blocks may include whether the transform blocks are luma or chroma block types, whether the transform blocks are encoded as transform skip blocks or transform-quantization bypass blocks, whether the transform blocks have intra-prediction or inter-prediction slice types, the size of the transform blocks, and/or the positions of the CGs within the transform blocks.

For a current CG in a transform block of the residual video data to be encoded, entropy encoding unit 56 determines an initial value of a Rice parameter based on the gathered statistics of the coefficient levels for the previously encoded coefficients (102). Conventionally, a value of the Rice parameter is initialized to zero at the beginning of each CG and conditionally updated after encoding remaining absolute values of coefficient levels in the CG. In the case of coding coefficient levels for screen content or in the case of lossless coding or lossy coding in transform skip mode, initializing the value of the Rice parameter to zero for each CG may not be optimal. The techniques of this disclosure describe setting the value of the Rice parameter at the beginning of each CG based on the gathered statistics instead of automatically resetting the value of the Rice parameter to zero.

In one example, described in more detail below with respect to FIG. 10, entropy encoding unit 56 determines the initial value of the Rice parameter for the current CG by mapping a value of the gathered statistics to the initial value of the Rice parameter according to a function of the statistics. In other examples, entropy encoding unit 56 may map a value of the gathered statistics to the initial value of the Rice parameter according to a stored table.

As described above in more detail, entropy encoding unit 56 may perform one or more scans of the current CG according to an inverse scan order to encode the coefficient levels of the coefficients in the current CG. For example, entropy encoding unit 56 may encode flags or syntax elements to indicate whether the coefficients have coefficient levels with absolute values that are greater than 1 or greater than 2 using context models in a regular coding mode. Entropy encoding unit 56 then encodes a flag or a syntax element to indicate a remaining absolute value of a coefficient level for at least one of the coefficients in the current CG using codes defined by the Rice parameter (104). For example, entropy encoding unit 56 may encode a syntax element indicating a remaining absolute value of a coefficient level for any of the coefficients with coefficient levels greater than 2 in bypass mode. In some examples, upon encoding the first remaining absolute value of a coefficient level in the current CG, entropy encoding unit 56 may update the statistics based on the coefficient level of the encoded coefficient.

In some cases, entropy encoding unit 56 may conditionally update the initial value of the Rice parameter based on the initial value of the Rice parameter and an absolute value of a coefficient level for a coefficient being encoded in the current CG. Entropy encoding unit 56 may continue to conditionally update the value of the Rice parameter after encoding each remaining absolute level for coefficients in the current CG. At the end of the current CG, entropy encoding unit 56 may determine an initial value of the Rice parameter for a subsequent CG based on statistics of coefficient levels for the previously encoded coefficients, including the recently encoded coefficients included in the current CG.

Figure 8:
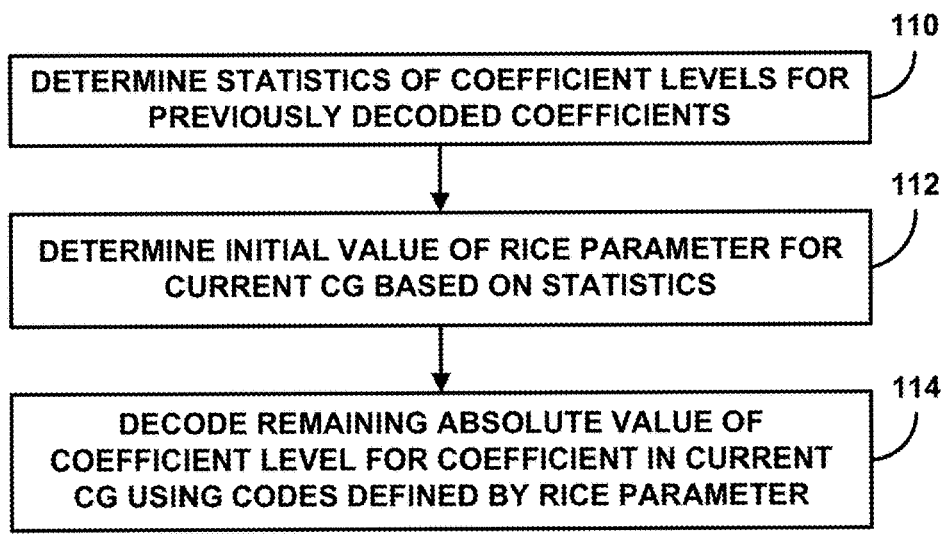
FIG. 8 is a flowchart illustrating an example operation of determining an initial value of a Rice parameter during entropy decoding of coefficient levels according to techniques described in this disclosure.

FIG. 8 is a flowchart illustrating an example operation of determining an initial value of a Rice parameter during entropy decoding of coefficient levels according to techniques described in this disclosure. The example operation is described with respect to video decoder 30 including entropy decoding unit 70 from FIG. 6.

Video decoder 30 receives an encoded video bitstream from video encoder 20 or from a storage device such as storage medium 34 or file server 36. The received video bistream represents coefficients of residual video data to be decoded. The residual video data coefficients may be included in coefficient groups (CGs), each of which is a subblock of a transform block (e.g., a 4×4 subblock as illustrated in FIG. 4). During decoding of the coefficients in the CGs, entropy decoding unit 70 determines statistics of coefficient levels for the previously decoded coefficients (110). In the example described in more detail below with respect to FIG. 9, determining the statistics of the coefficients levels for the previously decoded coefficients may comprise determining whether to increase or decrease a value of the statistics based on a comparison of a coefficient level for one or more of the previously decoded coefficients to a function of the statistics. A value of the statistics may be initialized to zero at a beginning of each slice of the residual video data.

In some examples, determining the statistics of the coefficient levels for the previously decoded coefficients may comprise calculating an average or a running average of the coefficient levels over a slice, a coding unit (CU), or a transform unit (TU) of the residual video data. In other examples, determining the statistics of the coefficient levels for the previously decoded coefficients may comprise determining whether to increase, decrease, or maintain a value of the statistics based on a comparison of a coefficient level for one of the previously encoded coefficients to the value of the statistics.

The statistics of the coefficient levels may include statistics of absolute values of the coefficient levels or statistics of remaining absolute values of the coefficient levels for the previously decoded coefficients. The statistics of the coefficient levels may be gathered for previously decoded coefficients in CGs that are all included in the same transform block, or for previously decoded coefficients in CGs that are included in two or more different transform blocks.

In some examples, entropy decoding unit 70 may determine the statistics of the coefficient levels for the previously decoded coefficients once per coefficient group. The frequency of the statistics gathering is described in more detail below with respect to FIG. 9. For example, entropy decoding unit 70 may determine the statistics when a first absolute value of a coefficient level is decoded in each of the previous CGs. Alternatively, entropy decoding unit 70 may determine the statistics when a first remaining absolute value of a coefficient level is decoded in each of the previous CGs. In other examples, entropy decoding unit 70 may determine the statistics of the coefficient levels for the previously decoded coefficients upon decoding each of the coefficients.

In addition, as described in more detail below with respect to FIG. 9, entropy decoding unit 70 may determine separate statistics for each of a plurality of different categories of CGs. The categories may be defined based on characteristics of the transform blocks that include the CGs. For example, the characteristics of the transform blocks may include whether the transform blocks are luma or chroma block types, whether the transform blocks are decoded as transform skip blocks or transform-quantization bypass blocks, whether the transform blocks have intra-prediction or inter-prediction slice types, the size of the transform blocks, and/or the positions of the CGs within the transform blocks.

For a current CG in a transform block of the residual video data to be decoded, entropy decoding unit 70 determines an initial value of a Rice parameter based on the gathered statistics of the coefficient levels for the previously decoded coefficients (112). In some processes, a value of the Rice parameter is initialized to zero at the beginning of each CG and conditionally updated after decoding remaining absolute values of coefficient levels in the CG. In the case of coding coefficient levels for screen content or in the case of lossless coding or lossy coding in transform skip mode, initializing the value of the Rice parameter to zero for each CG may not be optimal. The techniques of this disclosure describe setting the value of the Rice parameter at the beginning of each CG based on the gathered statistics instead of automatically resetting the value of the Rice parameter to zero.

In one example, described in more detail below with respect to FIG. 10, entropy decoding unit 70 determines the initial value of the Rice parameter for the current CG by mapping a value of the gathered statistics to the initial value of the Rice parameter according to a function of the statistics. In other examples, entropy decoding unit 70 may map a value of the gathered statistics to the initial value of the Rice parameter according to a stored table.

As described above in more detail, entropy decoding unit 70 may perform one or more scans of the current CG according to an inverse scan order to decode the coefficient levels of the coefficients in the current CG. For example, entropy decoding unit 70 may decode flags or syntax elements to indicate whether the coefficients have coefficient levels with absolute values that are greater than 1 or greater than 2 using context models in a regular coding mode. Entropy decoding unit 70 then decodes a flag or a syntax element to indicate a remaining absolute value of a coefficient level for at least one of the coefficients in the current CG using codes defined by the Rice parameter (114). For example, entropy decoding unit 70 may decode a syntax element indicating a remaining absolute value of a coefficient level for any of the coefficients with coefficient levels greater than 2 in bypass mode. In some examples, upon decoding the first remaining absolute value of a coefficient level in the current CG, entropy decoding unit 70 may update the statistics based on the coefficient level of the decoded coefficient.

In some cases, entropy decoding unit 70 may conditionally update the initial value of the Rice parameter based on the initial value of the Rice parameter and an absolute value of a coefficient level for a coefficient being decoded in the current CG. Entropy decoding unit 70 may continue to conditionally update the value of the Rice parameter after decoding each remaining absolute level for coefficients in the current CG. At the end of the current CG, entropy decoding unit 70 may determine an initial value of the Rice parameter for a subsequent CG based on statistics of coefficient levels for the previously decoded coefficients, including the recently decoded coefficients included in the current CG.

Figure 9:
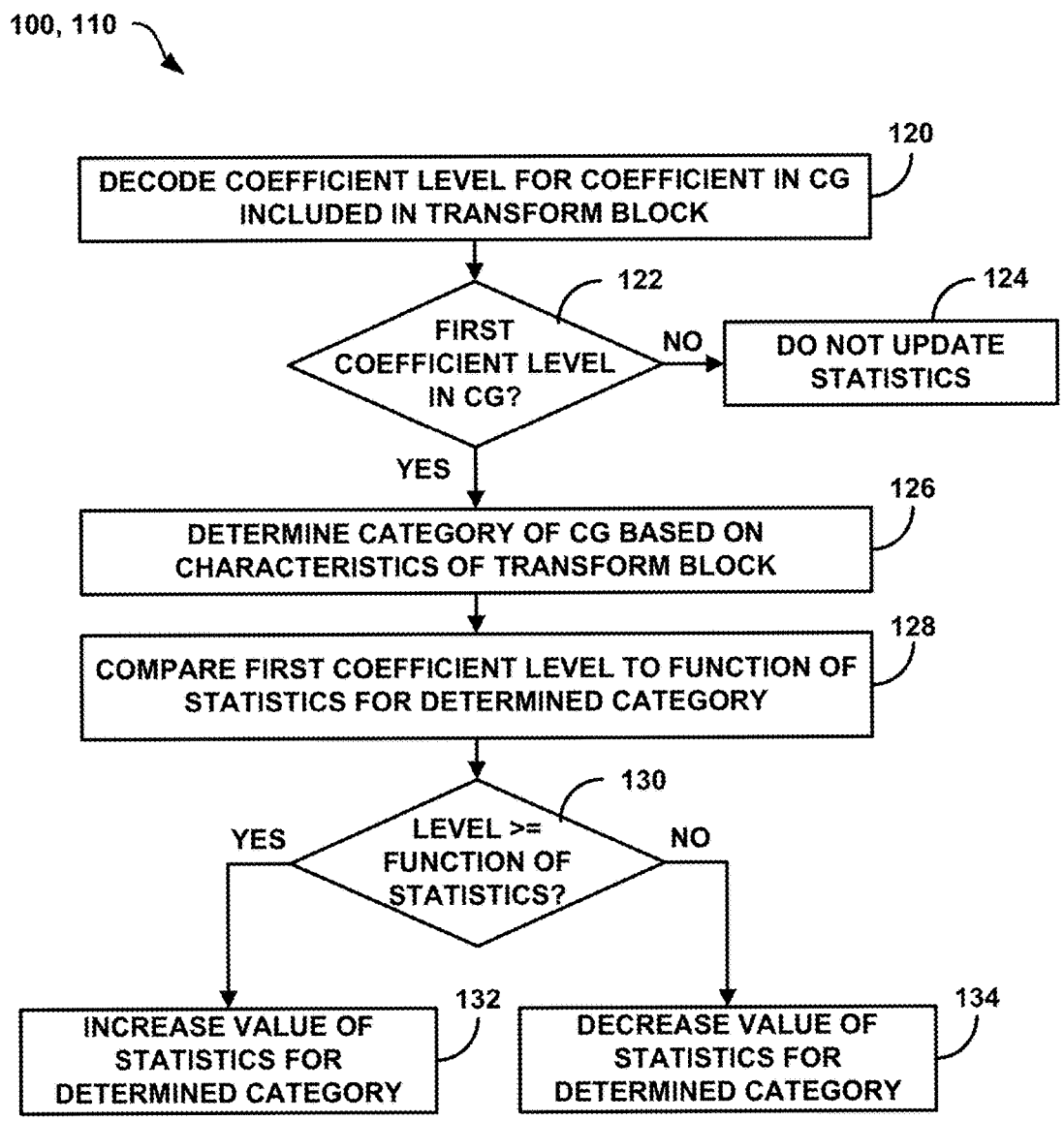
FIG. 9 is a flowchart illustrating an example operation of determining statistics of coefficient levels for previously coded coefficients during entropy coding of coefficient levels according to techniques described in this disclosure.

FIG. 9 is a flowchart illustrating an example operation of determining statistics of coefficient levels for previously coded coefficients during entropy coding of coefficient levels according to techniques described in this disclosure. The illustrated operation may be one example of step 100 from FIG. 7 or step 110 from FIG. 8. The example operation is described with respect to video decoder 30 including entropy decoding unit 70 from FIG. 6. In other examples, the operation may be performed by entropy encoding unit 56 of video encoder 20 from FIG. 5.

Entropy decoding unit 70 decodes a coefficient level for a coefficient in a CG included in a transform block (120). The coefficient level may comprise either an absolute value of the coefficient level or a remaining absolute value of the coefficient level. If the decoded coefficient level is not the first coefficient level in the CG (NO branch of 122), then entropy decoding unit 70 does not update the statistics based on the decoded coefficient level (124). In this example, the statistics are only updated once per CG when the first absolute value of a coefficient level or the first remaining absolution value of a coefficient level is coded in each of the CGs. In other example, the statistics may be updated more frequently or based on the coding of a different coefficient level.

If the decoded coefficient level is the first coefficient level in the CG (YES branch of 122), then entropy decoding unit 70 determines a category of the CG based on characteristics of the transform block (126). In one example, the characteristics of the transform block used to determine the category of the CG include whether or not the transform block is a luma block and whether or not the transform block is a transform skip block. In other examples, the characteristics used to determine the category of the CG may be different, e.g., whether or not the transform block is a transform-quantization bypass block, whether the transform block has an intra-prediction or inter-prediction slice type, the size of the transform block, and/or the position of the current CG within the transform block. In some examples, video decoder 30 may receive a syntax element indicating which characteristics of the transform block are used to define the different categories of CGs.

Entropy decoding unit 70 then compares the first coefficient level in the CG to a function of the statistics for the determined category (128). In one example, the function of the statistics used to update the statistics is based on a first constant value that is left-shifted by the value of the statistics divided by a second constant value. In other examples, the statistics may be determined according to different techniques, such as calculating an average or a running average of the coefficient levels over a slice or coding unit (CU) of the video data, or comparing a coefficient level in the CG directly to the value of the statistics.

If the first coefficient level in the CG is greater than or equal to the result of the function of the statistics (YES branch of 130), entropy decoding unit 70 increases the value of the statistics for the determined category (132). If the first coefficient level in the CG is less than the result of the function of the statistics (NO branch of 130), entropy decoding unit 70 decreases the value of the statistics for the determined category (134). In either case, entropy decoding unit 70 may use the updated statistics to determine an initial value of the Rice parameter for a subsequent CG of the determined category, as described in more detail below with respect to FIG. 10.

In the example of FIG. 9, the operation for determining the statistics only updates the statistics once per CG and gathers separate statistics for a plurality of different categories of CGs. In other examples, the operation for determining the statistics may update the statistics after coding remaining absolute values for coefficient levels in a CG. In additional examples, the operation for determining the statistics may only gather one category of statistics.

Figure 10:
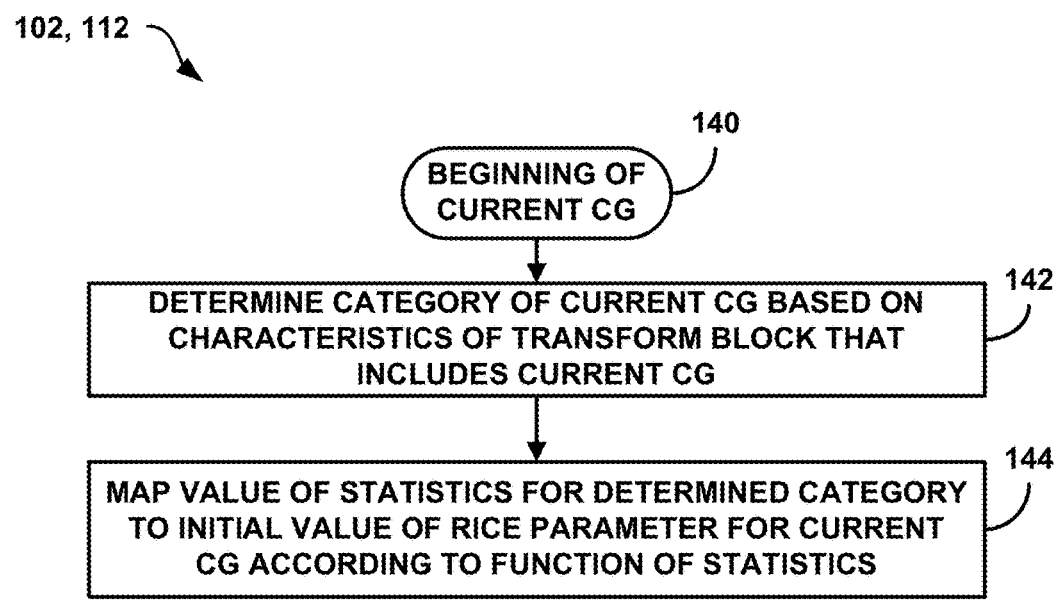
FIG. 10 is a flowchart illustrating an example operation of determining an initial value of a Rice parameter for a current coefficient group based on the determined statistics according to techniques described in this disclosure

FIG. 10 is a flowchart illustrating an example operation of determining an initial value of a Rice parameter for a current coefficient group based on the determined statistics according to techniques described in this disclosure. The illustrated operation may be one example of step 102 from FIG. 7 or step 112 from FIG. 8. The example operation is described with respect to video decoder 30 including entropy decoding unit 70 from FIG. 6. In other examples, the operation may be performed by entropy encoding unit 56 of video encoder 20 from FIG. 5.

At the beginning of a current CG in a transform block (140), entropy decoding unit 70 determines a category of the current CG based on characteristics of the transform block that includes the current CG (142). In one example, the characteristics of the transform block used to determine the category of the current CG include whether or not the transform block is a luma block and whether or not the transform block is a transform skip block. In other examples, the characteristics used to determine the category of the current CG may be different, e.g., whether or not the transform block is a transform-quantization bypass block, whether the transform block has an intra-prediction or inter-prediction slice type, the size of the transform block, and/or the position of the current CG within the transform block. In some examples, video decoder 30 may receive a syntax element indicating which characteristics of the transform block are used to define the different categories of CGs.

Entropy decoding unit 70 then maps the value of the statistics for the determined category to an initial value of the Rice parameter for the current CG according to the function of the statistics (144). In one example, the function of the statistics used to initialize the Rice parameter is based on a selection of a minimum of either a maximum value of the Rice parameter or the value of the statistics divided by a constant value. In other example, the initial value of the Rice parameter may be determined from the statistics according to different techniques, such as right-shifting the value of the statistics by a constant value, or applying a linear or piecewise linear function of the statistics. In still other examples, entropy decoding unit 70 may map the value of the statistics to the initial value of the Rice parameter according to a stored table in which each value of the statistics within a pre-defined range is mapped to a value of the Rice parameter up to a maximum value of the Rice parameter.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding coefficients in a video decoding process, the method comprising:
    determining statistics of coefficient levels for previously decoded coefficients of residual video data for each of a plurality of different categories of coefficient groups, wherein the different categories are defined based on characteristics of transform blocks that include the coefficient groups, and wherein the characteristics of the transform blocks of the previously decoded coefficients include whether the transform blocks are luma blocks and whether the transform blocks are transform skip blocks, the previously decoded coefficients being decoded prior to decoding a current coefficient group in a transform block of the residual video data;
    determining a category of the current coefficient group from the plurality of different categories based on characteristics of the transform block that includes the current coefficient group, wherein the characteristics of the transform block that includes the current coefficient group include whether the transform block is a luma block and whether the transform block is a transform skip block;
    prior to decoding any coefficients in the current coefficient group, determining an initial value of a Rice parameter for the current coefficient group based on the statistics for the determined category of the current coefficient group; and
    decoding a remaining absolute value of a coefficient level for at least one of the coefficients in the current coefficient group using codes defined by the initial value of the Rice parameter.

2. The method of claim 1, wherein the statistics comprise statistics of one of absolute values of the coefficient levels or remaining absolute values of the coefficient levels for the previously decoded coefficients.

3. The method of claim 1, wherein the statistics comprise statistics of the coefficient levels for the previously decoded coefficients in previous coefficient groups that are included in one or more of the same transform block as the current coefficient group or different transform blocks than the current coefficient group.

4. The method of claim 1, wherein determining the statistics comprises:
comparing a coefficient level for at least one of the previously decoded coefficients to a function of the statistics; and
determining whether to increase or decrease the value of the statistics based on the comparison.

5. The method of claim 4, wherein the function of the statistics comprises a first constant value left-shifted by a value of the statistics divided by a second constant value.

6. The method of claim 1, further comprising initializing a value of the statistics to zero at a beginning of each slice of the residual video data.

7. The method of claim 1, wherein determining the statistics comprises determining the statistics once per coefficient group.

8. The method of claim 7, wherein determining the statistics once per coefficient group comprises determining the statistics when one of a first absolute value of a coefficient level or a first remaining absolute value of a coefficient level is decoded in each of a plurality of previous coefficient groups.

9. The method of claim 1, further comprising receiving a syntax element indicating which characteristics of the transform blocks are used to define the different categories of coefficient groups, wherein the syntax element is received in one of a sequence parameter set (SPS) or a picture parameter set (PPS) for the residual video data.

10. The method of claim 1, wherein determining the initial value of the Rice parameter for the current coefficient group comprises mapping a value of the statistics to the initial value of the Rice parameter according to a function of the statistics.

11. The method of claim 10, wherein the function of the statistics comprises a selection of a minimum of either a maximum value of the Rice parameter or the value of the statistics divided by a constant value.

12. The method of claim 1, further comprising updating the initial value of the Rice parameter based on the initial value of the Rice parameter and an absolute value of the coefficient level for the at least one of the coefficients being decoded in the current coefficient group.

13. The method of claim 1, wherein the codes defined by the Rice parameter comprise one of Golomb-Rice codes or Exponential-Golomb codes.

14. The method of claim 1, wherein the current coefficient group comprises either transform coefficients or coefficients for which a transform is not applied.

15. The method of claim 1, wherein the characteristics of the transform blocks used to define the different categories of coefficient groups further include positions of the coefficient groups within the transform blocks used to define the different categories of coefficient groups, and wherein the characteristics of the transform block that includes the current coefficient group used to determine the category of the current coefficient group further includes the position of the current coefficient groups within the transform block that includes the current coefficient group.

16. A method of encoding coefficients in a video encoding process, the method comprising:
determining statistics of coefficient levels for previously encoded coefficients of residual video data for each of a plurality of different categories of coefficient groups, wherein the different categories are defined based on characteristics of transform blocks that include the coefficient groups, and wherein the characteristics of the transform blocks of the previously encoded coefficients include whether the transform blocks are luma blocks and whether the transform blocks are transform skip blocks, the previously encoded coefficients being encoded prior to encoding a current coefficient group in a transform block of the residual video data;
determining a category of the current coefficient group from the plurality of different categories based on characteristics of the transform block that includes the current coefficient group, wherein the characteristics of the transform block that includes the current coefficient group at least include whether the transform block is a luma block and whether the transform block is a transform skip block;
prior to encoding any coefficients in the current coefficient group, determining an initial value of a Rice parameter for the current coefficient group based on the statistics for the determined category of the current coefficient group; and
encoding a remaining absolute value of a coefficient level for at least one of the coefficients in the current coefficient group using codes defined by the initial value of the Rice parameter.

17. The method of claim 16, wherein the statistics comprise statistics of one of absolute values of the coefficient levels or remaining absolute values of the coefficient levels for the previously encoded coefficients.

18. The method of claim 16, wherein the statistics comprise statistics of the coefficient levels for the previously encoded coefficients in previous coefficient groups that are included in one or more of the same transform block as the current coefficient group or different transform blocks than the current coefficient group.

19. The method of claim 16, wherein determining the statistics comprises:
comparing a coefficient level for at least one of the previously encoded coefficients to a function of the statistics; and
determining whether to increase or decrease the value of the statistics based on the comparison.

20. The method of claim 19, wherein the function of the statistics comprises a first constant value left-shifted by a value of the statistics divided by a second constant value.

21. The method of claim 16, further comprising initializing a value of the statistics to zero at a beginning of each slice of the residual video data.

22. The method of claim 16, wherein determining the statistics comprises determining the statistics once per coefficient group.

23. The method of claim 22, wherein determining the statistics once per coefficient group comprises determining the statistics when one of a first absolute value of a coefficient level or a first remaining absolute value of a coefficient level is encoded in each of a plurality of previous coefficient groups.

24. The method of claim 16, further comprising generating a syntax element indicating which characteristics of the transform blocks are used to define the different categories of coefficient groups, wherein the syntax element is generated in one of a sequence parameter set (SPS) or a picture parameter set (PPS) for the residual video data.

25. The method of claim 16, wherein determining the initial value of the Rice parameter for the current coefficient group comprises mapping a value of the statistics to the initial value of the Rice parameter according to a function of the statistics.

26. The method of claim 25, wherein the function of the statistics comprises a selection of a minimum of either a maximum value of the Rice parameter or the value of the statistics divided by a constant value.

27. The method of claim 16, further comprising updating the initial value of the Rice parameter based on the initial value of the Rice parameter and an absolute value of the coefficient level for the at least one of the coefficients being encoded in the current coefficient group.

28. The method of claim 16, wherein the codes defined by the Rice parameter comprise one of Golomb-Rice codes or Exponential-Golomb codes.

29. The method of claim 16, wherein the current coefficient group comprises either transform coefficients or coefficients for which a transform is not applied.

30. The method of claim 16, wherein the characteristics of the transform blocks used to define the different categories of coefficient groups further include positions of the coefficient groups within the transform blocks used to define the different categories of coefficient groups, and wherein the characteristics of the transform block that includes the current coefficient group used to determine the category of the current coefficient group further includes the position of the current coefficient groups within the transform block that includes the current coefficient group.

31. A video coding device comprising:
a memory configured to store video data; and
one or more processors configured to:
determine statistics of coefficient levels for previously coded coefficients of residual video data for each of a plurality of different categories of coefficient groups, wherein the different categories are defined based on characteristics of transform blocks that include the coefficient groups, and wherein the characteristics of the transform blocks of the previously coded coefficients include whether the transform blocks are luma blocks and whether the transform blocks are transform skip blocks, the previously coded coefficients being coded prior to coding a current coefficient group in a transform block of the residual video data;
determine a category of the current coefficient group from the plurality of different categories based on characteristics of the transform block that includes the current coefficient group, wherein the characteristics of the transform block that includes the current coefficient group include whether the transform block is a luma block and whether the transform block is a transform skip block;
prior to coding any coefficients in the current coefficient group, determine an initial value of a Rice parameter for the current coefficient group based on the statistics for the determined category of the current coefficient group; and
code a remaining absolute value of a coefficient level for at least one of the coefficients in the current coefficient group using codes defined by the initial value of the Rice parameter.

32. The device of claim 31, wherein the statistics comprise statistics of one of absolute values of the coefficient levels or remaining absolute values of the coefficient levels for the previously coded coefficients.

33. The device of claim 31, wherein the statistics comprise statistics of the coefficient levels for the previously coded coefficients in previous coefficient groups that are included in one or more of the same transform block as the current coefficient group or different transform blocks than the current coefficient group.

34. The device of claim 31, wherein the processors are configured to:
compare a coefficient level for at least one of the previously coded coefficients to a function of the statistics; and
determine whether to increase or decrease the value of the statistics based on the comparison.

35. The device of claim 34, wherein the function of the statistics comprises a first constant value left-shifted by a value of the statistics divided by a second constant value.

36. The device of claim 31, wherein a value of the statistics is initialized to zero at a beginning of each slice of the residual video data.

37. The device of claim 31, wherein determining the statistics comprises determining the statistics once per coefficient group.

38. The device of claim 37, wherein the processors are configured to determine the statistics when one of a first absolute value of a coefficient level or a first remaining absolute value of a coefficient level is coded in each of a plurality of previous coefficient groups.

39. The device of claim 31, wherein the processors are configured to determine a syntax element indicating which characteristics of the transform blocks are used to define the different categories of coefficient groups, wherein the syntax element is included in one of a sequence parameter set (SPS) or a picture parameter set (PPS) of the residual video data.

40. The device of claim 31, wherein the processors are configured to map a value of the statistics to the initial value of the Rice parameter for the current coefficient group according to a function of the statistics.

41. The device of claim 40, wherein the function of the statistics comprises a selection of a minimum of either a maximum value of the Rice parameter or the value of the statistics divided by a constant value.

42. The device of claim 31, wherein the processors are configured to update the initial value of the Rice parameter based on the initial value of the Rice parameter and an absolute value of the coefficient level for the at least one of the coefficients being coded in the current coefficient group.

43. The device of claim 31, wherein the video coding device comprises a video decoding device, and wherein the processors of the video decoding device are configured to decode the remaining absolute value of the coefficient level for the at least one of the coefficients in the current coefficient group using codes defined by the initial value of the Rice parameter.

44. The device of claim 31, wherein the video coding device comprises a video encoding device, and wherein the processors of the video encoding device are configured to encode the remaining absolute value of the coefficient level for the at least one of the coefficients in the current coefficient group using codes defined by the initial value of the Rice parameter.

45. The device of claim 31, wherein the codes defined by the Rice parameter comprise one of Golomb-Rice codes or Exponential-Golomb codes.

46. The device of claim 31, wherein the current coefficient group comprises either transform coefficients or coefficients for which a transform is not applied.

47. The device of claim 31, wherein the characteristics of the transform blocks used to define the different categories of coefficient groups further include positions of the coefficient groups within the transform blocks used to define the different categories of coefficient groups, and wherein the characteristics of the transform block that includes the current coefficient group used to determine the category of the current coefficient group further includes the position of the current coefficient groups within the transform block that includes the current coefficient group.

48. A video coding device comprising:
   means for determining statistics of coefficient levels for previously coded coefficients of residual video data for each of a plurality of different categories of coefficient groups, wherein the different categories are defined based on characteristics of transform blocks that include the coefficient groups, and wherein the characteristics of the transform blocks of the previously coded coefficients include whether the transform blocks are luma blocks and whether the transform blocks are transform skip blocks, the previously coded coefficients being coded prior to coding a current coefficient group in a transform block of the residual video data;
   means for determining a category of the current coefficient group from the plurality of different categories based on characteristics of the transform block that includes the current coefficient group, wherein the characteristics of the transform block that include the current coefficient group include whether the transform block is a luma block and whether the transform block is a transform skip block;
   means for, prior to coding any coefficients in the current coefficient group, determining an initial value of a Rice parameter for the current coefficient group based on the statistics for the determined category of the current coefficient group; and
   means for coding a remaining absolute value of a coefficient level for at least one of the coefficients in the current coefficient group using codes defined by the initial value of the Rice parameter.

49. The device of claim 48, wherein the means for determining the statistics comprise:
   means for comparing a coefficient level for at least one of the previously coded coefficients to a function of the statistics, wherein the function of the statistics comprises a first constant value left-shifted by a value of the statistics divided by a second constant value; and
   means for determining whether to increase or decrease the value of the statistics based on the comparison.

50. The device of claim 48, wherein the means for determining the statistics comprise means for determining the statistics once per coefficient group when one of a first absolute value of a coefficient level or a first remaining absolute value of a coefficient level is coded in each of a plurality of previous coefficient groups.

51. The device of claim 48, wherein the means for determining the initial value of the Rice parameter for the current coefficient group comprise means for mapping a value of the statistics to the initial value of the Rice parameter according to a function of the statistics, wherein the function of the statistics comprises a selection of a minimum of either a maximum value of the Rice parameter or the value of the statistics divided by a constant value.

52. A non-transitory computer-readable storage medium comprising instructions that when executed by one or more processors of a video coding device cause the processors to: determine statistics of coefficient levels for previously coded coefficients of residual video data for each of a plurality of different categories of coefficient groups, wherein the different categories are defined based on characteristics of transform blocks that include the coefficient groups, and wherein the characteristics of the transform blocks of the previously coded coefficients include whether the transform blocks are luma blocks and whether the transform blocks are transform skip blocks, the previously coded coefficients being coded previous to a current coefficient group in a transform block of the residual video data; determine a category of the current coefficient group from the plurality of different categories based on characteristics of the transform block that includes the current coefficient group, wherein the characteristics of the transform block that includes the current coefficient group include whether the transform block is a luma block and whether the transform block is a transform skip block; prior to coding any coefficients in the current coefficient group, determine an initial value of a Rice parameter for the current coefficient group based on the statistics for the determined category of the current coefficient group; and code a remaining absolute value of a coefficient level for at least one of the coefficients in the current coefficient group using codes defined by the initial value of the Rice parameter.

* * * * *